(12) United States Patent
Maeda et al.

(10) Patent No.: US 7,561,322 B1
(45) Date of Patent: Jul. 14, 2009

(54) PROJECTION DISPLAY SYSTEM FOR MODULATING LIGHT BEAMS FROM PLURAL LASER LIGHT SOURCES

(75) Inventors: Yoshihiro Maeda, Hachioji (JP); Fusao Ishii, Menlo Park, CA (US); Hirotoshi Ichikawa, Hachioji (JP); Kazuma Arai, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/004,165

(22) Filed: Dec. 19, 2007

(51) Int. Cl.
*G02B 26/00* (2006.01)
*B60Q 1/26* (2006.01)

(52) U.S. Cl. .................................... 359/290; 362/227

(58) Field of Classification Search ................ 359/263, 359/223–224, 290–292, 318, 649, 846, 872; 362/227, 235, 247, 277, 280–284, 306
See application file for complete search history.

(56) References Cited

U.S. PATENT DOCUMENTS

| | | | |
|---|---|---|---|
| 4,871,231 A | 10/1989 | Garcia, Jr. | |
| 5,214,420 A | 5/1993 | Thompson et al. | |
| 5,537,258 A | 7/1996 | Yamazaki et al. | |
| 6,733,135 B2 | 5/2004 | Dho | |
| 6,767,100 B1 | 7/2004 | Long et al. | |
| 6,807,010 B2 | 10/2004 | Kowarz | |
| 6,865,309 B2 | 3/2005 | Dho | |
| 6,874,893 B2 | 4/2005 | Park | |
| 7,232,224 B2 | 6/2007 | Penn | |
| 2004/0218155 A1 | 11/2004 | Schenk et al. | |
| 2006/0268241 A1* | 11/2006 | Watson et al. | 353/94 |

* cited by examiner

*Primary Examiner*—Scott J Sugarman
*Assistant Examiner*—Dawayne A Pinkney
(74) *Attorney, Agent, or Firm*—Bo-In Lin

(57) ABSTRACT

The present invention provides a projection display system comprising: illumination lights of plural colors emitted from plural laser light sources; an illumination optical system for illuminating the illumination light of at least one of the colors in an beam axis or in an illumination range, either of which is different from the other colors; a deflection mirror device for modulating the illumination lights of respective colors in the same deflection angle, with the modulation of each color being performed in sequence within one frame; a projection optical system for projecting the reflection light of the illumination light from the deflection mirror device; and a laser light source control circuit for controlling the intensity of the illumination light of each color, wherein the laser light source control circuit performs adjustment so that the ratio of intensity of each of the colors is a prescribed ratio.

27 Claims, 21 Drawing Sheets

PROJECTION DISPLAY SYSTEM FOR MODULATING LIGHT BEAMS FROM PLURAL LASER LIGHT SOURCES

The present invention claims a Priority Date of a previously filed Provisional Application filed by the same Applicants of this invention on Dec. 20, 2006 and the previously filed Provisional Application has an Application Number that is misplaced, not yet determinable and to be added to this Application later.

FIELD OF THE INVENTION

The present invention relates to a projection display system. More particularly, this invention relates to a projection display system for modulating light beams from plural light sources.

DESCRIPTION OF THE RELATED ART

After the dominance of CRT technology in the display industry, Flat Panel Display (hereafter FPD) and Projection Display gained popularity because of the advantages of smaller form-factor and larger size of screen. Of several types of projection displays, projection displays using micro-display are gaining recognition by consumers because of high performance of picture quality as well as lower cost than FPDs. There are two types of micro-displays used for projection displays in the market. One is micro-LCD (Liquid Crystal Display) and the other is micromirror technology. Because a micromirror device uses un-polarized light, a micromirror device has an advantage on brightness over micro-LCD, which uses polarized light.

Even though there are significant advances made in recent years on the technologies of implementing electromechanical micromirror devices as spatial light modulator, there are still limitations and difficulties when it was employed to provide high quality images display. Specifically, when the display images are digitally controlled, the image qualities are adversely affected due to the fact that the image is not displayed with sufficient number of gray scales.

Electromechanical micromirror devices have drawn considerable interest because of their application as spatial light modulators (SLMs). A spatial light modulator requires an array of a relatively large number of micromirror elements. In general, the number of micromirror elements required ranges from 60,000 to several million for each SLM.

Referring to FIG. 1A for an image display system 1 including a screen 2 is disclosed in a reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to columnate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 33 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

FIG. 1D shows the "binary time periods" in the case of controlling SLM by four-bit words. As shown in FIG. 1D, the time periods have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n bits word for controlling the gray scale, one frame time is divided into $(2^n-1)$ equal time slices. If one frame time is 16.7 msec., each time slice is $16.7/(2^n-1)$ msec.

Having set these time lengths for each pixel in each frame of the image, the quantity of light in a pixel which is quantified as 0 time slices is black (no the quantity of light), 1 time slice is the quantity of light represented by the LSB, and 15 time slices (in the case of n=4) is the quantity of light represented by the maximum brightness. Based on quantity of light being quantified, the time of mirror holding at the ON position during one frame period is determined by each pixel. Thus, each pixel with a quantified value which is more than 0 time slices is displayed by the mirror holding at an ON position with the number of time slices corresponding to its quantity of light during one frame period. The viewer's eye integrates brightness of each pixel so that the image is displayed as if the image were generated with analog levels of light.

For controlling deflectable mirror devices, the PWM calls for the data to be formatted into "bit-planes", where each bit-plane corresponds to a bit weight of the quantity of light. Thus, when the brightness of each pixel is represented by an n-bit value, each frame of data has the n-bit-planes. Then, each bit-plane has a 0 or 1 value for each mirror element. In the PWM described in the preceding paragraphs, each bit-plane is independently loaded and the mirror elements are controlled according to bit-plane values corresponding to them during one frame. For example, the bit-plane representing the LSB of each pixel is displayed as 1 time slice.

A display device used for a rear projection television (TV) commonly employs a liquid crystal display (LCD), liquid crystal on silicon (LCOS), a deflection mirror device (DMD) and such, with the individual display devices having their individual characteristics.

The LCD is a display device that transmits a deflecting illumination light, and controlling the array of liquid crystal molecule of each pixel of the LCD individually via voltage enables the change of the transmitted light intensity of the deflected illumination light. A circuit for driving the liquid crystal on the LCD, however, is placed around each pixel and therefore the aperture ratio of the pixel is only about 50%, a small value. Further, the usage efficiency of a projected light intensity after being transmitted through various optical elements, such as a deflection plate or a liquid crystal, is reduced to a few percent, a very low value. Meanwhile, the wavelength of light is also gradually changed as the light is transmitted various optical elements due to the spectral characteristic of the light, and thus the technical problem arises of the color of light changing a little when the light is projected onto a screen. In the meantime, the LCOS is a display device using a liquid crystal for modulation control of light as in the case of the LCD, except that the LCOS is a reflective type while the LCD is a transmissive type. A circuit for driving each pixel of the LCOS is placed under the pixel and therefore the aperture ratio exceeds 90%. A projection display system using the LCOS transmits the illumination light twice on the same light path when the light is incident and when reflection occurs. The use of different polarizations in response to the fact that the incident light and reflection light pass in the same light path separates the incident light and reflection light. Specifically, the incident light into and reflection light from the LCOS are separated using a polarizing beam splitter (PBS) prism capable of determining whether to transmit or reflect the light depending whether P-polarization or S-polarization has occurred. The projection display system using the LCOS, however, is faced with the problems such as the influence of disturbance in polarization associated with passing through an optical element and the inability to enlarge the numerical aperture NA of the illumination light, thus undermining the usage efficiency of light as a projection display system even though the aperture ratio is good.

The projection display system using the LCD or LCOS performing a modulation of light by controlling the array of liquid crystal molecules with a voltage is commonly configured as a multi-plate color display system placing three display devices corresponding to the light sources of the respective colors of red (R), green (G) and blue (B). Such a configuration makes it possible to project a bright screen image.

Meanwhile, the deflection mirror device (DMD) provides the aperture ratio of each pixel at about 90% and also the reflectance ratio of the illumination light on the mirror at 90%, thus making a display device with very good usage ratio of light. The DMD controls the inclination of a mirror surface by controlling a deflection mirror element to switchover in two directions, that is, in an ON state reflecting the illumination light toward the projection optical system and an OFF state reflecting the light away from the projection optical system, thereby making it possible to control the projection light. The DMD allows a small loss of the light intensity in the projection light for the ON state due to the use of the mirror. Among the projection display systems, there is a configuration adopting a single-plate sequential color display system using only one DMD and projecting each respective color of RGB continuously. In the single-plate sequential color display system, each respective color of RGB is projected in one third of the time during one frame. Further, adopting a multi-plate projection display system using three DMDs enables the provision of a brighter color image. The multi-plate projection display system using three DMDs, however, is faced with the technical problem of the optical system within the projection display system becoming complex and of the occupying space increasing because of the light paths of the reflection light in the ON state and OFF state being different, resulting in the projection display becoming large.

The illumination light source used for a display apparatus comprising the display device as described above employs a very bright light source such as a high-pressure mercury lamp or a xenon lamp. Recent years have witnessed the use of a light source excelling in color rendition than before thanks to the compact design and high brightness of LED light source and laser light sources, and in particular have witnessed the announcement of many semiconductor solid state light sources which are even less inexpensive and brighter. Also developed is a laser light source enabling a comprisal of a projection display system which requires an input of the power of about three watts and which is brighter than the conventional high pressure mercury lamp or the like.

In the case of performing a color display of an image by using a plurality of laser light sources in a projection display system, a switchover control for switching the ON/OFF for the laser light sources instead of using a color wheel makes it possible to control each respective color of RGB in a time sequence and to make the light incident to the above described display device and project the image. As such a configuration using a plurality of laser light sources, reference patent document 3 has disclosed a configuration in which a plurality of laser lights having different colors are converged to the same optical axis by using mirrors corresponding to individual laser lights and the laser light of each color is illuminated in a time sequence by using a color wheel. The light beam thusly emitted from the laser light source is very fine and highly directional, providing also good space usage efficiency between the light source and the optical system that expands the light beam. Further, as disclosed in reference patent document 4, the light beam from a laser light source, as a rectangle, can also illuminate on the entirety of a display device, providing very good convenience in terms of configuring a projection optical system. Therefore, the use of a laser as light source is highly significant, enabling the simplification of the light source and illumination optical system of the projection display system.

Next, in the projection display system using the DMD as a display device, the projection display system needs to be designed so that the inclination angle of the mirror surface of each deflection mirror element of a plurality of deflection mirror elements constituting the DMD is changed between the time of the ON state reflecting the light to the projection light path and the time of the OFF state reflecting the light to a path other than the projection light path, thereby making it possible to separate the light path of the illuminated light and separating, spatially, the incident light path of the light beam of the illumination light from the reflection light path of the light beam reflecting onto the projection screen so that the light emitted to the DMD when in the OFF state does not influence the generation of gradation of the projection light. Here, as for the incident light path of the illumination light, the conventional configuration is such that the illumination light emitted from the respective RGB laser light sources is synthesized in the same optical axis by way of a dichroic mirror or the like, and the illumination light of the result of synthesizing the three colors is incident to the DMD.

Because of this, the light beams of the respective RGB illumination lights are all incident, at the same angle in the same optical axis, to the mirror surfaces of the plurality of deflection mirror elements constituting the DMD. Further, the illumination range of the illumination light conjugate to the pupil of the projection lens is also approximately the same, becoming the characteristic of the reflection light of each illumination light being the same optical axis. Related to the incident light path of the light beam of the illumination light, such a configuration of the respective RGB laser lights lining up to the same optical axis by using a dichroic mirror or the like corresponding to the respective laser lights is common in the conventional projection display system, and as an example, FIG. 5 of reference patent document 5, i.e., FIG. 2 of the present specification document, delineates the configuration of a projection display system in which the three-color laser lights 104, 105 and 106 are lined up to the same optical axis by using two half-mirrors 102 and 103, and an image is projected onto a screen 112 by way of a liquid crystal panel 101 and beam expander 113. Note that the configuration is such that the three color laser lights 104, 105 and 106 are connected to a controller 111 via cables 108, 109 and 110, and likewise the liquid crystal panel 101 is also connected to the controller 111 via a cable 107, so that the three color laser lights 104, 105 and 106 are synchronously controlled by the liquid crystal panel.

As described above, however, although the use of laser light has simplified the light source and illumination optical system, it is still faced with the technical problem that the lining up the individual RGB laser lights to the same optical axis by using a dichroic mirror or the like corresponding to the respective laser lights requires the securing of space for placing mirrors corresponding to respective laser lights and requires precise mirror placements at the time of assembling the projection display system and therefore the design of the illumination optical system is difficult. Countering this technical problem, reference patent document 6 has disclosed the configuration of emitting the laser light of each color from a Cube prism, without converging the individually colored lights to the same optical axis, to the display device modulating the light corresponding to each color; this configuration, however, is faced with the technical problem of requiring a complex optical system such as a prism.

There are additional Patents that may relate to the invention of this Application. These patents are U.S. Pat. No. 5,214,420, U.S. Pat. No. 5,285,407, U.S. Pat. No. 6,874,893, U.S. Pat. No. 6,865,309, U.S. Pat. No. 5,537,258, and U.S. Pat. No. 6,767,100. However, none of these disclosures provide an effective solution to resolve the above discussed difficulties and limitations. Therefore, a new and improved image display system is still required.

SUMMARY OF THE INVENTION

In consideration of the problem described above, the present invention aims to provide a projection display system with further simplified configuration than the conventional configuration, for emitting laser light of each color to a deflection mirror device without converging them to the same optical axis, thereby projecting an image.

A first aspect of the present invention is to provide a projection display system comprising:

illumination lights of plural colors emitted from plural laser light sources; an illumination optical system for illuminating the illumination light of at least one of the colors in an beam axis, or in an illumination range, either of which is different from the other colors; a deflection mirror device for modulating the illumination lights of respective colors in the same deflection angle, with the modulation of each color performed in sequence within one frame; a projection optical system for projecting the reflection light of the illumination light from the deflection mirror device; and a laser light source control circuit for controlling the intensity of the illumination light of each color, wherein the laser light source control circuit adjusts so that the ratio of intensity of each of the colors is a prescribed ratio.

A second aspect of the present invention provides the projection display system according to the first aspect, wherein the plural laser light sources emit the illumination lights of red, green and blue, wherein the intensity of the illumination light of each of the colors irradiating the deflection mirror device in terms of the ratio of green to blue is 10:1 or higher, in terms of the ratio of green to red is 2:1 or higher, or in terms of the ratio of red to blue is 3:1 or higher.

A third aspect of the present invention provides the projection display system according to the first aspect, wherein the plural laser light sources emit the illumination lights of red, green and blue, and the deflection mirror device is illuminated with any of the colors of cyan, magenta, yellow and white.

A fourth aspect of the present invention provides the projection display system according to the first aspect, wherein the deflection mirror device is constituted by plural mirror elements controlled in the states of ON and OFF, and the ratio is that of the reflection light of the illumination light of each of the colors in the ON state.

A fifth aspect of the present invention provides the projection display system according to the first aspect, wherein the deflection mirror device is constituted by plural mirror elements controlled in the states of ON, OFF and oscillating, and the ratio is that in the position of the pupil of the projection optical system in the oscillating state.

A sixth aspect of the present invention provides the projection display system according to the first aspect, wherein the ratio of the intensity of the illumination light of each of the colors is determined by an irradiation intensity per unit area on the irradiation surface of the deflection mirror device.

A seventh aspect of the present invention provides the projection display system according to the first aspect, wherein the ratio of the intensity of the illumination light of each of the colors is determined by an intensity being transmitted through the pupil of the projection optical system.

An eighth aspect of the present invention provides the projection display system according to the first aspect, wherein the laser light source control circuit controls the illumination light intensity of each of the colors by pulse emitting control A ninth aspect of the present invention provides the projection display system according to the first aspect, wherein the laser light source control circuit controls an illumination period of the illumination light within the one frame.

A tenth aspect of the present invention provides the projection display system according to the ninth aspect, wherein at least one of the colors is modulated for the time period of ¼ to ½ of the display period of the one frame.

An eleventh aspect of the present invention provides the projection display system according to the first aspect, wherein the laser light source of each of the colors is a laser light source array constituted by plural sub-laser light sources.

A twelfth aspect of the present invention provides the projection display system according to the first aspect, wherein the laser light source of each of the colors is a laser light source array constituted by plural sub-laser light sources, wherein the laser light source control circuit controls the number of sub-laser light sources to be emitted or the position of sub-laser sources to be emitted.

A thirteenth aspect of the present invention provides the projection display system according to the first aspect, wherein the laser light source is constituted by plural sub-laser elements in a two-dimensional array, wherein the wavelengths of the individual sub-laser elements are different by 1 nm to 3 nm.

A fourteenth aspect of the present invention provides the projection display system according to the first aspect, wherein the number of gray scales of an image projected by modulating the illumination lights from the laser light sources of the respective colors is the same for each of the colors.

A fifteenth aspect of the present invention provides the projection display system according to the first aspect, wherein the number of gray scale gradations of an image projected by modulating the illumination lights from the laser light sources of the respective colors is different for each of the colors.

A sixteenth aspect of the present invention provides the projection display system according to the first aspect, wherein the plural laser light sources are constituted by laser light sources of at least three colors, and at least two of the deflection mirror devices are disposed, wherein each of the deflection mirror devices modulates the illumination light from the laser light sources of at least two colors.

A seventeenth aspect of the present invention provides the projection display system according to the first aspect, wherein the deflection mirror device is constituted by plural mirror elements, wherein the mirror element is a square having one side being 4 micrometers to 10 micrometers and has the reflectance efficiency of the light flux being different for each of the colors of the laser light sources.

An eighteenth aspect of the present invention is to provide a projection display system comprising:

illumination lights of plural colors from laser light source;

an illumination optical system for illuminating the illumination light of at least one of the colors in a beam axis, or in an illumination range, either of which is different from the other colors;

a deflection mirror device for deflecting the illumination lights by plural mirror elements;

a projection optical system for projecting the reflection light of the illumination light from the deflection mirror device; and a control circuit for controlling modulation of each of the colors in sequence within one frame and also making the modulation time of the deflection mirror device variable so that the ratio of intensity of each of the colors is a prescribed value.

A nineteenth aspect of the present invention provides the projection display system according to the eighteenth aspect, wherein the deflection mirror device is controlled in accordance with a non-binary video signal.

A twentieth aspect of the present invention provides the projection display system according to the eighteenth aspect, wherein the mirror element constituting the deflection mirror device is controlled under an ON state, an OFF state and an oscillating state.

A twenty-first aspect of the present invention provides the projection display system according to the eighteenth aspect, wherein the number of gray scales of an image projected by modulating the illumination light from the laser light sources of each of the colors is different for each thereof.

A twenty-second aspect of the present invention provides the projection display system according to the eighteenth aspect, wherein the control circuit determines the number of the gray scales of each of the colors in accordance with the control time.

A twenty-third aspect of the present invention provides the projection display system according to the eighteenth aspect, wherein the control circuit controls the number of the gray scales variably in accordance with the video signal.

A twenty-fourth aspect of the present invention provides the projection display system according to the eighteenth aspect, wherein the plural laser light sources are constituted by laser light sources of at least three colors, and at least two of the deflection mirror devices are disposed, wherein each of the deflection mirror devices modulates the illumination light from the laser light sources

DESCRIPTION OF THE PREFERRED EMBODIMENT

The present invention provides a projection display system includes an optical element for transmitting the light beams from plural laser light sources having mutually different beam axes without changing the different beam axes. The display system further includes a deflection mirror device for receiving the light beams and modulating the light beams received in specified time duration. The display system further includes a projection optical system for projecting the reflection light from the deflection mirror device illuminated by the light beams.

Figure 3A:
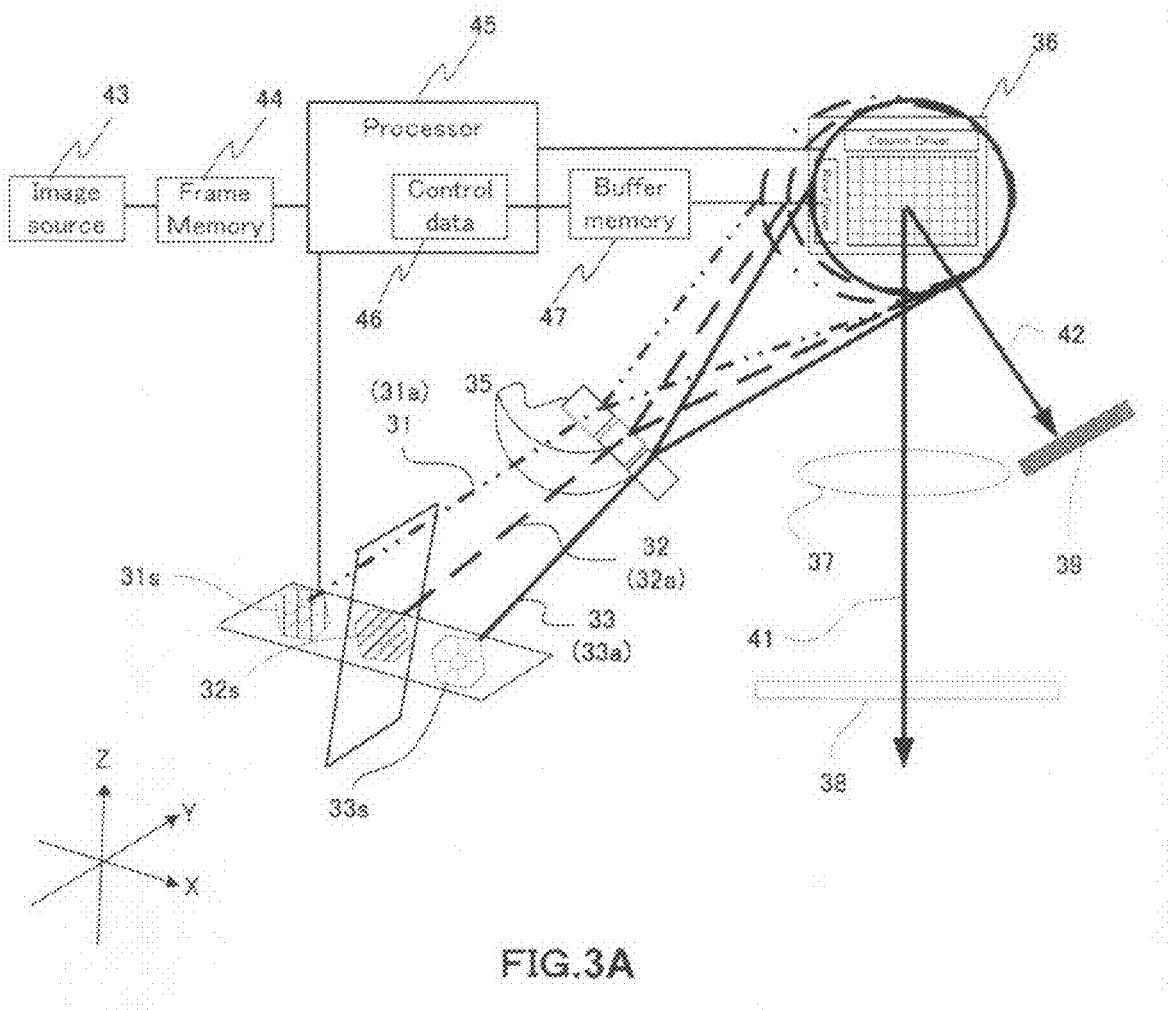
FIG. 3A shows a projection display system configured to expand individual light beams from plural laser light sources having mutually different beam axes according to one embodiment of the present invention.

FIG. 3A shows the simplified configuration of a projection display system according to one embodiment of the present invention. According to this exemplary embodiment, FIG. 3 shows a projection display system configured to emit the respective laser lights to the deflection mirror device from plural laser light sources. The plural laser light sources are arranged in the display system to have individually different beam axes. FIG. 3A illustrates the case of implementing three laser light sources, i.e., Blue 31, Red 32 and Green 33, to the deflection mirror device 36. The three laser light sources, i.e., Blue 31s, Red 32s and Green 33s, have mutually different beam axes 31a, 32a and 33a, respectively, on the X-Y plane. Three respective laser light beams of Blue 31, Red 32 and Green 33 incident to an optical element 35. The optical element 35 expands the individual laser light beams 31, 32 and 33. The optical element 35 is placed between the deflection mirror device 36 and individual laser light sources 31s, 32s and 33s. The light beams of the individual laser lights are expanded by the optical element 35 and the beams of the respective laser lights of Blue 31, Red 32 and Green 33 to illuminate and cover approximately the entire surface of the deflection mirror device 36. The angles of lights incident to one deflection mirror element of the deflection mirror device 36 are mutually different by configuring the individual light sources to have mutually different beam axes 31a, 32a and 33a. The cross-sectional forms of the individual laser light beams 31, 32 and 33 are asymmetrical with respect to the optical axis and the light beams have an elliptical shape.

The laser light beams 31, 32 and 33 each have a cross-sectional form to maintain symmetry. The deflection mirror 36 receives the expansively illuminated laser light beams 31, 32 and 33 and modulates each laser light in a specified time duration according to a time-division modulation control process. In the event when a deflection mirror device 36 is controlled to operate a mirror in the ON state, the modulated laser light is reflected toward the projection lens 37. An image is projected onto a screen 38 through the projection lens 37 by projecting the reflection light, i.e., the ON light 41 of the individual laser light beams 31, 32 and 33. These laser light beams are modulated and reflected by, the deflection mirror element of the deflection mirror device 36 in the ON state. When the laser light beams 31, 32 and 33 illuminate one deflection mirror element of the deflection mirror device 36, one of the deflection mirror elements reflects the light beam of an elliptical form to the position of the pupil of the projection lens 37. Note that the individual laser light sources 31s, 32s and 33s and the deflection mirror device 36 is synchronously controlled by using a processor 45. By controlling the switchover corresponding to the deflection mirror device 36, the individual laser light sources 31s, 32s and 33s are controlled to emit the individual laser light beams 31, 32 and 33 either individually or simultaneously.

Meanwhile, the optical element 35 is provided to expand, toward the deflection mirror device, the individual laser light beams 31, 32 and 33. These light beams are projected from the plural laser light sources in an emission range having a light beam cross-section of different zones or different area sizes respectively. The configuration of the display system as shown generates a difference in the emission range of the respective laser light beams 31, 32 and 33 on the surface of the deflection mirror device. There are different beam axes 31*a*, 32*a* and 33*a* for the respective laser light beams 31, 32 and 33 and therefore the emission range can be adjusted so that the individual laser lights are emitted to the mirror array surfaces of the deflection mirror device. The mirror array surface is referred to the entirety of the mirror surfaces formed as array that is extended crosswise in two dimensions that includes plural deflection mirror elements thus constituting the deflection mirror device. The present specification document uses this terminology hereinafter.

Further, the optical element 35 is configured with the numerical aperture NA having the cross-section non-uniform or asymmetrical in the direction of the individual laser light beams 31, 32 and 33 projected from the plural laser lights onto the individual deflection mirror elements of the deflection mirror device. The non-uniform or asymmetrical beams further allow the flexibilities of controlling and adjusting the intensity of light. The light may be projected with non-uniform or asymmetrical light intensity within the range of the numerical aperture NA. The light beam transmitted through the optical element 35 with the NA non-uniform or asymmetrical aperture correspond to the respective laser light reflected by the respective deflection mirror elements generates a difference in the NA among the individual laser light beams 31, 32 and 33. The asymmetry or the non-uniformity of the image display light is maintained when transmitted through the pupil of the projection lens 37. Alternatively, it is possible to configure the numerical aperture NA non-uniform or asymmetrical so as to have a different light intensity distribution depending on the direction of the cross section of the light beam at the pupil position of the projection lens 37.

Figure 3B:
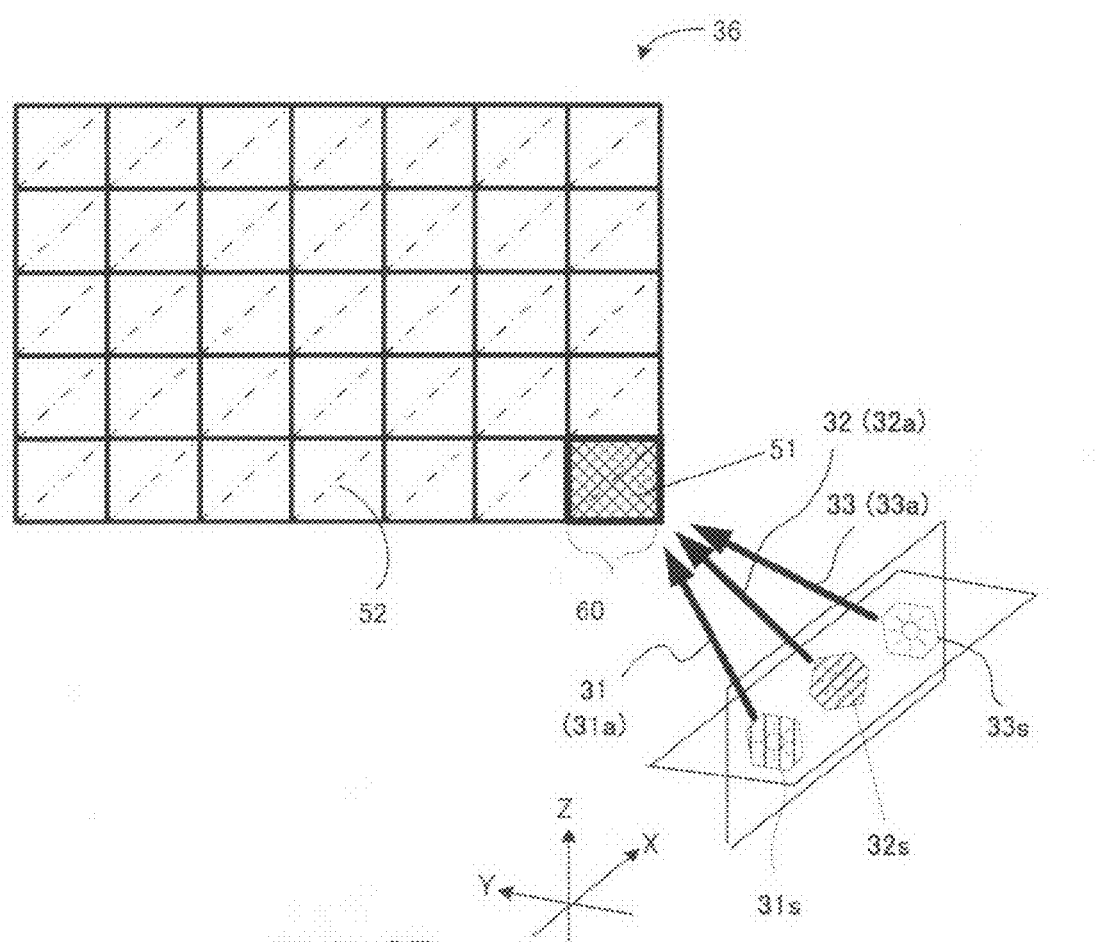
FIG. 3B illustrates the plural laser lights having mutually different beam axes shown in FIG. 3A being made incident to deflection mirror devices.

The configuration as described above generates a difference in the emission range of the individual laser light beams 31, 32 and 33 when these beams are transmitted through the pupil the projection lens. The zones of the individual laser light beams 31, 32 and 33 in transmitting through the projection lens and the light intensity of these beams can be adjusted. FIGS. 3A and 3B show the optical element 35 with three kinds of optical elements corresponding to respective laser light sources to control and change the zone and area size of emission to the deflection mirror device. Further, the optical element 35 employs an optical element having an anemographic surface. One exemplary optical element has a cylindrical surface, another exemplary optical element has an eccentric freely curved surface, another exemplary optical element has a diffraction grid, and yet another exemplary optical element has an optical element having a nano-structure. These different kinds of surfaces allows the flexibilities to control and change the emission zone, numerical aperture NA and light intensity of laser light depending on the position and angle of the individual laser light incident to the optical element.

Further, image data is inputted from an image source 43 by way of a frame memory 44 for modulating the light beams projected from the plural laser light sources by controlling deflection mirror device on the projection display system shown in FIG. 3A. The processor 45 controls the deflection mirror device 36 and the plural laser light sources by synchronizing both with each other. The plural deflection mirror elements and plural laser light sources are controlled in response to the image data applied to control the deflection mirror device. The laser light of a color corresponding to the deflection mirror device controlled at the time of light incidence making it possible to project an image onto the screen 38 correspondent to the image data. The individual laser light sources according to the first embodiment of the present invention are configured to change over via a switching between ON and OFF in sync with the deflection mirror device.

The plural laser light sources are individual laser light sources Blue 31, Red 32 and Green 33 of the respective colors emitting color light beams according to a time sequence at 180 Hz or higher frequency within one frame period under the control of the processor 45. For some application it is preferable to project the color light beams according to a time sequence at 360 Hz in the repeated pattern, i.e., Red, Green, Blue, Red, Green, Blue and so on. The individual laser light sources preferably use the approximate wavelengths 540 nm±20 nm, 630 nm±20 nm and 460 nm±20 nm for green, red and blue, respectively. This configuration makes it possible to utilize the wavelength dependency of an optical element with flexibilities to adjust the illumination range, numerical aperture NA, and intensity distribution for each color light projected from the light sources. Because a diffraction grid has different diffraction angles depending on the wavelength of the incident lights, it is preferable that the light sources project light beams of different and non-overlapping wavelengths. Likewise, when the direction of polarization is different among the light sources of different colors, a polarization selection element is used for an optical element to select a light source to carry out a color sequential control for the image display system.

In an exemplary embodiment, the plural laser light sources 31*s*, 32*s* and 33*s* may be implemented with a laser array comprising a plurality of semiconductor lasers, i.e., a sub-laser light source, emitting a laser light corresponding to each color. In such a case, the ratio of intensity of each color is controllable by adjusting the number of, or the position of, emitting units of the plurality of semiconductor lasers functioning as the sub-laser light sources. Each of individual color laser light sources is configured by arraying a large number of semiconductor lasers which have a relatively small output and low cost, thereby making it possible to provide high output laser light from the light sources 31*s*, 32*s* and 33*s*.

The deflection mirror device 36 includes a column driver and a row driver driven by control data 46 and buffer memory 47 under the control of the processor 45. The inclination of the mirror surface of the individual deflection mirror element among plural deflection mirror elements is controlled to operate in the ON state for reflecting the light beam. toward the projection optical system. The mirror is controlled to operate in the OFF state for reflecting the light beam away from the projection optical system. The mirror is controlled to operate in the intermediate state to partially reflect the light beam toward the projection optical system. Alternately, the mirror is controlled to operate in the oscillating state to oscillate between the ON state and OFF state, thereby reflecting, toward the projection optical system 37 or light dump 39. The laser light beams 31, 32 and 33 projected from the plural laser light sources are expanded by the optical element 35. The OFF light 42 is reflected to the light dump 39 is shielded therein.

The first embodiment of the present invention is configured to implement several laser light sources. The creation of a very bright laser light source of no less than three watts has been announced recently. This configuration enables a very bright illumination. The system configuration is different from a high-pressure mercury lamp or systems similar to the high-pressure mercury lamp systems. There are further flexibilities to set a required light intensity for each color in relation to the irradiation zone and area size of the laser light. With this laser light source, it is conveniently achievable to provide and control a pulse emission from the light sources and flexibly adjust the light intensity of the laser lights.

FIG. 3B illustrates the arrangements of each laser light projected from respective laser light sources having mutually different beam axes on the X-Y plane. These lights project onto a deflection mirror device by way of an optical element (not specifically shown here) for expanding the light beam of each laser light.

The deflection mirror device 36 shown in FIG. 3B comprises plural deflection mirror elements 60. Each deflection mirror element 60 is controlled to change the inclination of the mirror surface 51 about the deflection axis 52 by controlling the ON state/OFF state by applying a voltage to the electrode of the deflection mirror element. As the individual deflection mirror element 60 is in the ON state, the deflection mirror reflects the light beam illuminating onto the deflection mirror element. The inclination of the mirror surface can be so set so as to reflect the individual laser light beams 31, 32 and 33 having mutually different beam axes 31a, 32a and 33a on the X-Y plane shown in FIG. 3A toward the light path of the projection lens 37 along the direction of the screen 38. With the deflecting mirror in the OFF state, it reflects the light beam away from the projection optical system. The inclination of the mirror surface can be set so as to reflect the individual laser light to the light path of the light dump 39. The first embodiment is configured to place the plural laser light sources 31s, 32s and 33s having mutually different beam axes 31a, 32a and 33a on the X-Y plane. The beam axes 31a, 32a and 33a have different angles in the direction parallel to the mirror array surface of the deflection mirror device.

Figure 3C:
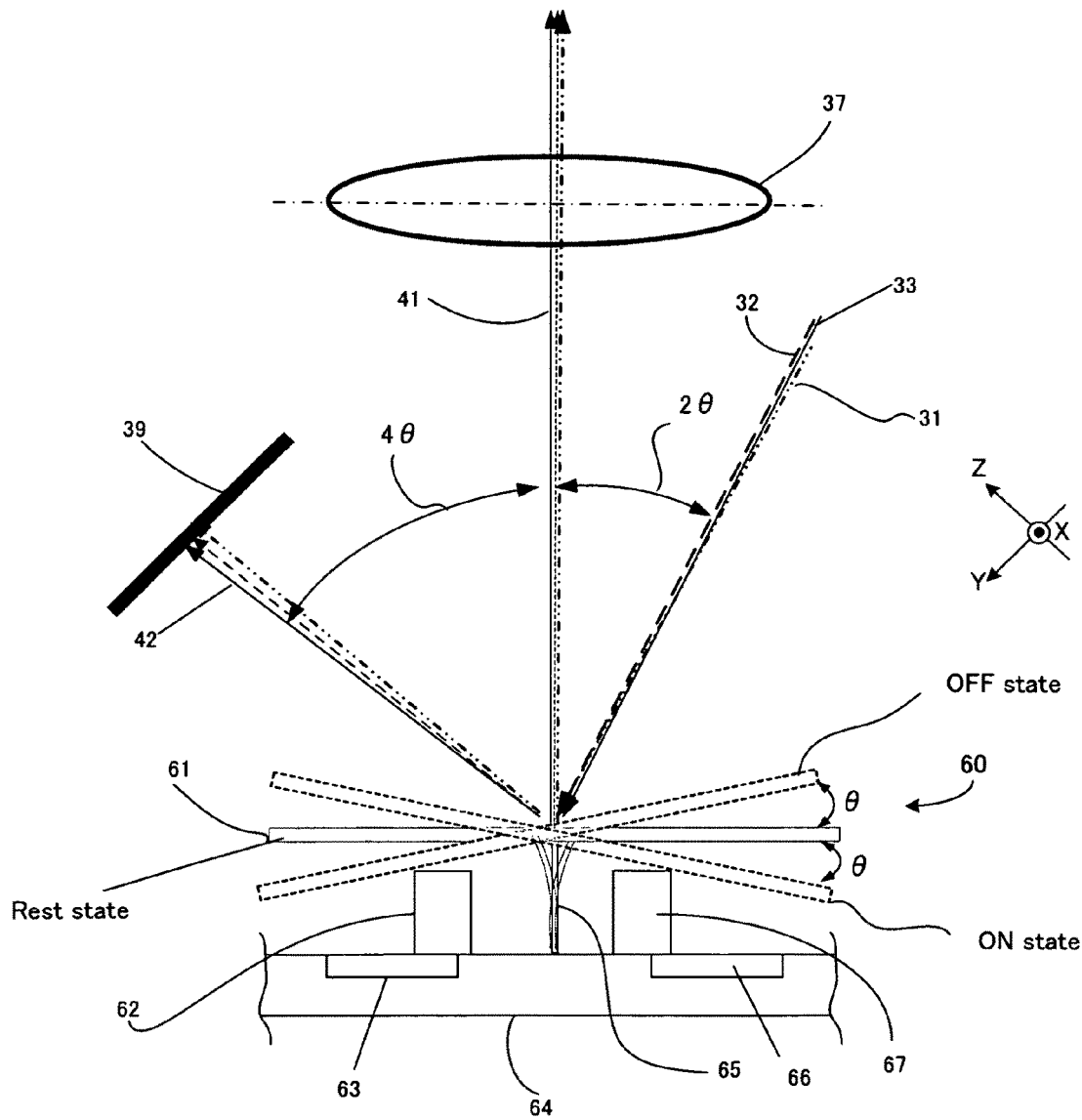
FIG. 3C depicts how the reflection light path of the plural laser lights having mutually different beam axes shown in FIG. 3B are controlled by the inclination of the mirror surface of the deflection mirror elements constituting a deflection mirror device.

FIG. 3C is diagram for illustrating a cross sectional view of a mirror pixel element to further depict in detail the reflection of each laser light toward the projection optical system 37 or light dump 39 depending on the tilt angles of the deflection mirror element of the deflection mirror device. The individual laser light sources have mutually different beam axes on the X-Y plane.

Specifically, in FIG. 3C, the individual laser light beams 31, 32 and 33 emitted from the respective laser light sources having mutually different beam axes 31a, 32a and 33a on the X-Y plane. These light beams are expanded by the optical element 35 and irradiated to one deflection mirror element 60 of the deflection mirror device. The intensity distribution of the light beam emitted from a single laser light source has a normal distribution and the cross-section of the light beam has approximately a circular shape. Furthermore, the light beam irradiated onto the deflection mirror element 60 from the respective laser light sources has approximately elliptical or an elongated shape after passing through the optical element 35. is The light beam has the cross-section with numerical aperture NA, or intensity distribution along the deflecting direction of each deflecting mirror element 60 in a direction orthogonal to the direction of deflection.

When the mirror 61 of the deflection mirror element 60 is in the ON state, the individual laser light beams 31, 32 and 33 are reflected toward the light path of the projection lens 37. The individual laser light beams 31, 32 and 33 have different beam axes 31a, 32a and 33a on the X-Y plane when reflected from the deflection mirror element. the beams are reflected along the beam axes 31a, 32a and 33a and these beam axes are mutually different in the X-Y plane for projecting to the projection lens 37. The beam axes 31a, 32a and 33a of the respective laser light beams 31, 32 and 33 are different in the X direction. The X direction is parallel to the deflection axis of the deflection mirror element of the deflection mirror device. When the inclination of the mirror surface of the mirror element is in the ON state representing by an inclination angle θ in relation to the mirror surface in the stationary state, the angle between projection light path 41 and the incident light path of the laser light beams 31, 32 and 33 is 2θ based on the principle of reflection. On the other hand, when the deflection mirror element 60 is in the OFF state, the individual laser light beams 31, 32 and 33 are reflected to the light path of the light dump 39 and shielded therein. Furthermore, the individual laser light beams 31, 32 and 33 have different beam axes 31a, 32a and 33a on the X-Y plane when reflected from the deflection mirror element. The reflected lights are also transmitted in mutually different beam axes 31a, 32a and 33a in the X-Y plane direction for projecting to the light dump 39. The beam axes 31a, 32a and 33a of the respective laser light beams 31, 32 and 33 are different in the X direction when the mirror is controlled to operate in the ON state. When the inclination of the mirror surface of the deflection mirror element is in the OFF state represented by an inclination angle θ in relation to the mirror surface in the stationary state, the angle between the light dump light path 42 and the projection light path 41 of the individual laser light beams 31, 32 and 33 is 4θ based on the principle of reflection. One deflection mirror element 60 of the deflection mirror device used for the first embodiment of the present invention comprises an elastic hinge part 65 supported on a substrate 64. The mirror 61 is joined to the elastic hinge part 65 as shown in FIG. 3C. The electrodes 63 and 66 are placed on the upper surface of the substrate on the left and right sides of the elastic hinge part 65. An application of a voltage to the individual electrodes 63 and 66 generates a coulomb force between the mirror 61 and electrodes to incline the mirror surface. An OFF stopper 62 and an ON stopper 67 are placed on the upper surface of the substrate on the left and right sides of the elastic hinge part 65 so that the OFF stopper 62 and ON stopper 67 limit the inclination of the mirror within certain range of tilt angles. FIG. 3C shows the ON stopper 67 placed on the right side of the elastic hinge part 65 to limit the incline angle of the mirror surface in the ON state The OFF stopper 62 is placed on the left side of the elastic hinge part 65 for limiting the incline angle of the mirror surface in the OFF state. The stationary state is configured with the inclination angle of the mirror surface at θ=0 degrees. The ON state is configured with the inclination angle of the mirror surface at θ=12 degrees. The OFF state is configured with the inclination angle of the mirror surface at θ=−12 degrees. The intermediate state is configured with the inclination angle of the mirror surface for θ=between −8 degrees and +8 degrees.

Figure 3D:
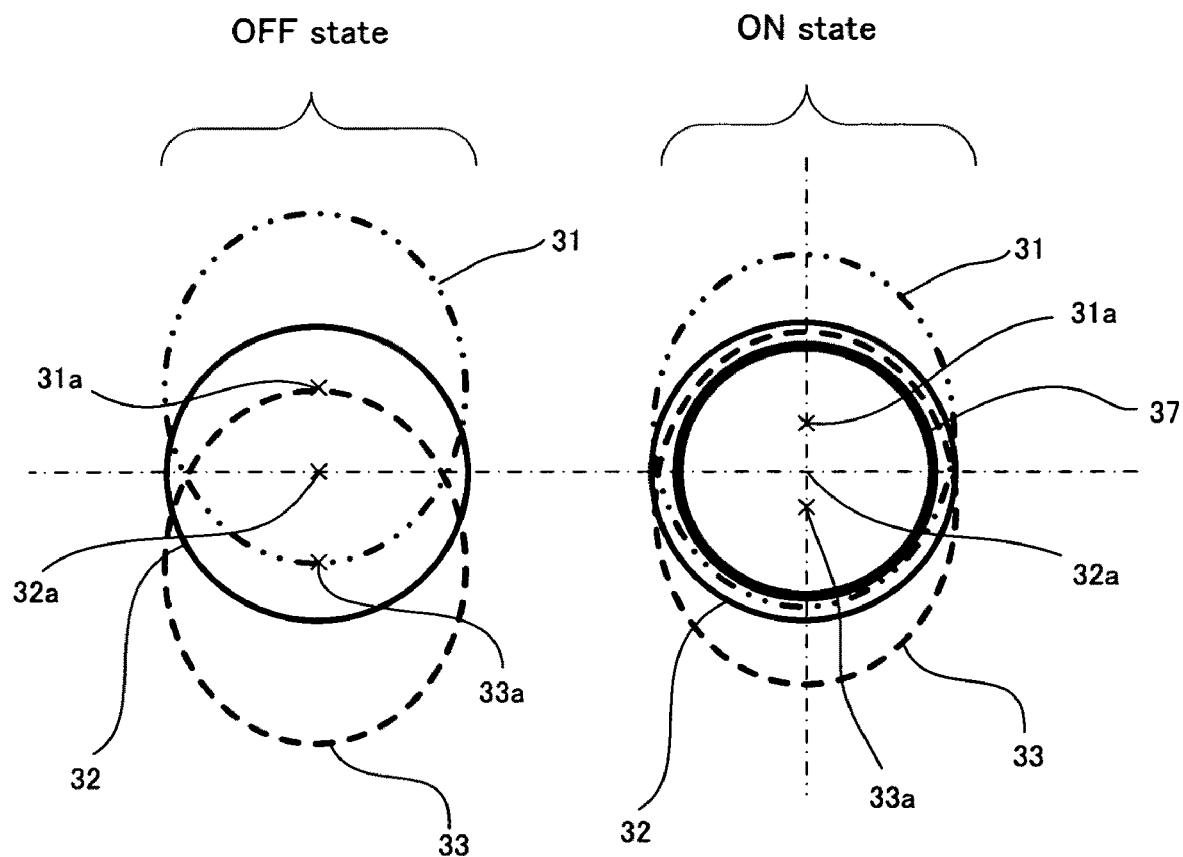
FIG. 3D depicts a cross-sectional diagram of the light beam of the plural laser light beams reflected by the deflection mirror elements of the deflection mirror device shown in FIG. 3C at the position of the pupil of a projection lens which is in the ON state and OFF state.
Figure 3E:
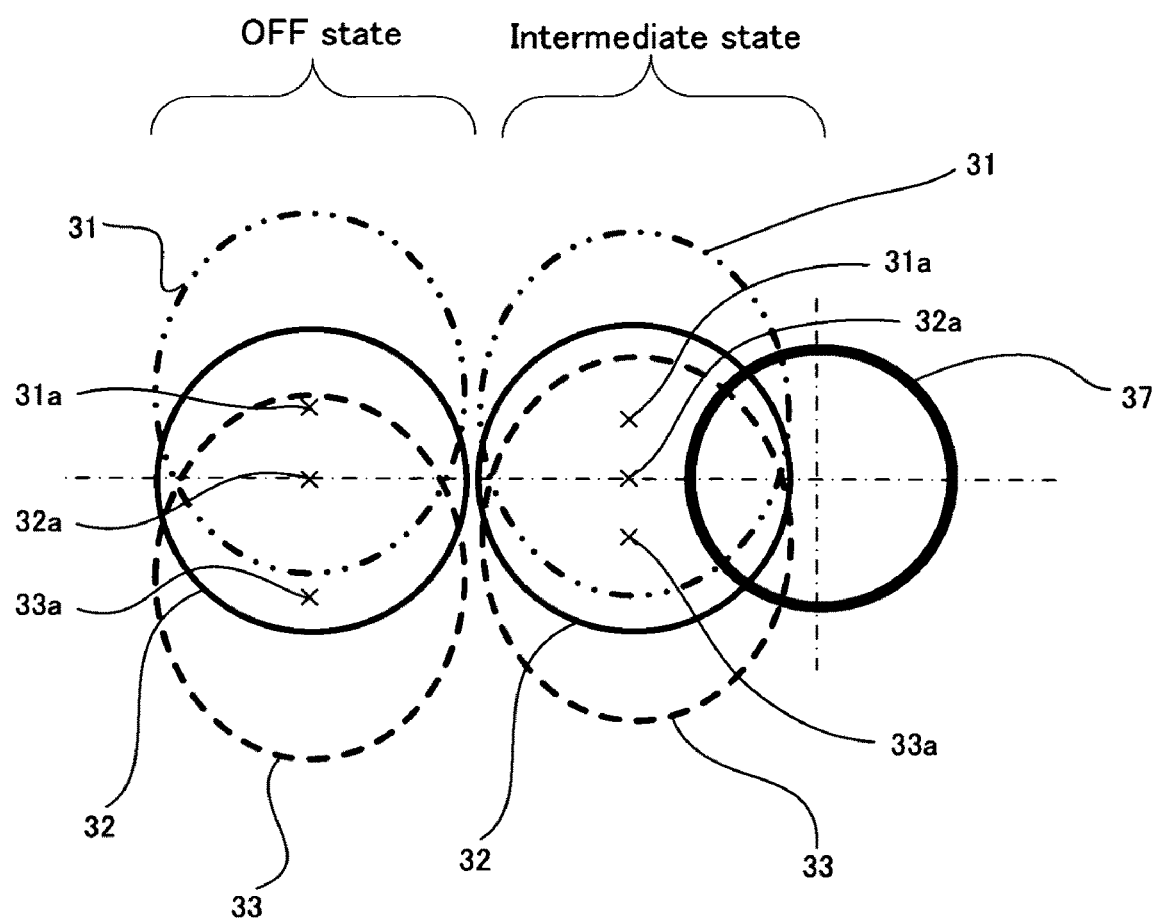
FIG. 3E is a cross-sectional diagram of the light beam of the plural laser light beams reflected by the deflection mirror elements of the deflection mirror device shown in FIG. 3C at the position of the pupil of a projection lens which is in an intermediate state and the OFF state.

FIGS. 3D and 3E depict the cross-sectional diagram of the light beam of the plural laser light beams reflected by the deflection mirror elements of the deflection mirror device shown in FIG. 3C at the pupil of a projection lens.

In FIG. 3D, the individual laser light beams 31, 32 and 33 have a numerical aperture NA with an elliptical or elongated cross-sectional shape. The elliptical or elongated beams are produced by the optical element that expands the individual laser lights from plural laser light sources that have mutually different beam axes 31a, 32a and 33a on the X-Y plane and incident to the projection lens so as to cover the entirety of the projection lens 37 when the deflection mirror element is in the ON state. With this configuration, it is easy to change the light intensity distribution of the reflection light from the deflection mirror device in a prescribed direction in relation to the pupil diameter of the projection optical system by using an optical element. The projection lens 37 projects some portion of the individual laser light beams 31, 32 and 33 illuminated with an elliptical shape or elongated cross-sectional shape. The required light intensity of the individual laser lights may be controllable by adjusting the portion of light projected from the projection lens 37. In an exemplary embodiment the individual laser light sources have different beam axes 31a, 32a and 33a on the X-Y plane and therefore the individual laser light beams 31, 32 and 33 are specifically shifted on the X-Y plane. Since the individual laser light beams 31, 32 and 33 cover the entirety of the projection lens, all of the laser lights will have overlapping ranges at the projection lens 37 for projecting an image. With the overlapping projection in this configuration, an image can be obtained by providing adequate light intensity within the range of the projection lens as a result of expanding, to an irradiation range having the cross-section of light beam of various forms in individually different zone or different area size. Furthermore, since the individual laser light beams 31, 32 and 33 from the plural laser light sources have mutually different beam axes 31a, 32a and 33a and covering the entirety of the projection lens control of light intensity for image display may be flexibly adjusted to achieve higher level of gray scales.

Likewise, when the deflection mirror element is in the OFF state in the cross-sectional diagram of the light beam of the projection lens shown in FIG. 3D at the pupil position, the individual laser light beams 31, 32 and 33 illuminated by a light beam have an elliptical form or elongated cross-sectional shape. The individual laser lights from plural laser light sources have mutually different beam axes 31a, 32a and 33a on the X-Y plane are reflected by the deflection mirror element toward the light path of the light dump 39 away from the projection lens 37. The individual laser light sources comprise different beam axes 31a, 32a and 33a on the X-Y plane and therefore the individual laser light beams 31, 32 and 33 reflected by the deflection mirror device are reflected with specific shifts on the X-Y plane. The light shield of the light dump 39 prevents reflection or interferences of these lights projected away from the projection lens. In FIG. 3D, the individual laser light beams 31, 32 and 33 illuminated by the optical element are reflected so as to cover the entirety of the projection lens when the deflection mirror element is in the ON state. Since the individual laser light beams 31, 32 and 33 illuminated by the optical element are reflected, the problems of the lights projected to projection lens during the OFF state is further reduced FIG. 3E further illustrates the ON state/OFF state of the deflection mirror element of the deflection mirror device with the control of the inclination angle of the mirror surface. FIG. 3E further illustrates by a cross-sectional diagram of the light beams, at the pupil of a projection lens for receiving the individual laser light beams reflected by the deflection mirror elements of the deflection mirror device of FIG. 3C when the mirror surface is in the intermediate state.

When the inclination of the mirror surface of the deflection mirror element is controlled to operate in the intermediate state, the individual laser light beams 31, 32 and 33 with a numerical aperture NA having an elliptical or elongated cross-shape are partially incident to the projection lens 37. The partial incidence of the individual laser light beams 31, 32 and 33 to the projection lens 37 makes it possible to transmit a reduced light intensity through a projection lens relative to the light intensity of the ON state. This allows a greater flexibility for light intensity adjustment to achieve a finer resolution of grayscales. The individual laser light sources with different beam axes 31a, 32a and 33a on the X-Y plane cause the individual laser light beams 31, 32 and 33 reflected by the deflection mirror device with specific shifts on the X-Y plane. The individual laser light beams 31, 32 and 33 are transmitted through the projection lens in the respective transmission ratios associated with the different beam axes 31a, 32a and 33a. The specific shifts are related to the expansion ratio by the optical element. Therefore, the light intensity of the reflection light beam transmitted through the projection optical system may be flexibly adjusted for each laser light source in the intermediate state.

The modulation control of the ON state, OFF state and oscillating state or intermediate state of the deflection mirror element of the deflection mirror device makes it possible to adjust the light transmitted through the projection optical system and to increase the gradation of the color. It is preferable that the modulation control for the deflection mirror element is provided to carry out an oscillation control by using non-binary data. The non-binary data is a obtained by dividing the binary data of a video signal into the smallest units of video signals.

Furthermore, the adjustment of the timing for controlling the deflection mirror element of the deflection mirror device under the oscillating state or intermediate state combined with the timing control of the emission state of the laser light makes it possible to achieve a finer adjustment of the display light intensity. As an example, a 50% reduction in the light intensity of a laser light in the modulation state of the mirror projecting a light intensity of $\frac{1}{16}$ in the oscillating state or intermediate state relative to the ON-state of the laser light emitting 100% in a deflection mirror element makes it possible to control and adjust the light intensity transmitted through the projection lens at an incremental light intensity of $\frac{1}{32}$ of the fully-ON light intensity.

Moreover, if all of the pixels are controlled approximately simultaneously for a prescribed time period within one frame during the time at which the oscillating state or intermediate state is controlled, extraneous light from the substrate of the deflection mirror device and optical system is reduced when the illumination light intensity of a laser light is 50%. Therefore, in projecting a light intensity or displaying a dark video image, a reduction in laser light intensity improves the contrast of the image. Furthermore, a laser has a wide range of color rendition, so that a combination with a mirror device having the oscillating state or intermediate state enables the display of a video image with higher color quality.

Thus in an exemplary embodiment, the display device is configured to widen the numerical aperture NA of an illumination light beam in a direction orthogonal to the deflection direction of the mirror surface of the deflection mirror element. This optical functional feature causes a reflection light near the OFF state to shift away from the pupil of the projection lens, thereby further reduce interferences and improve contrast of the image display.

Figure 4A:
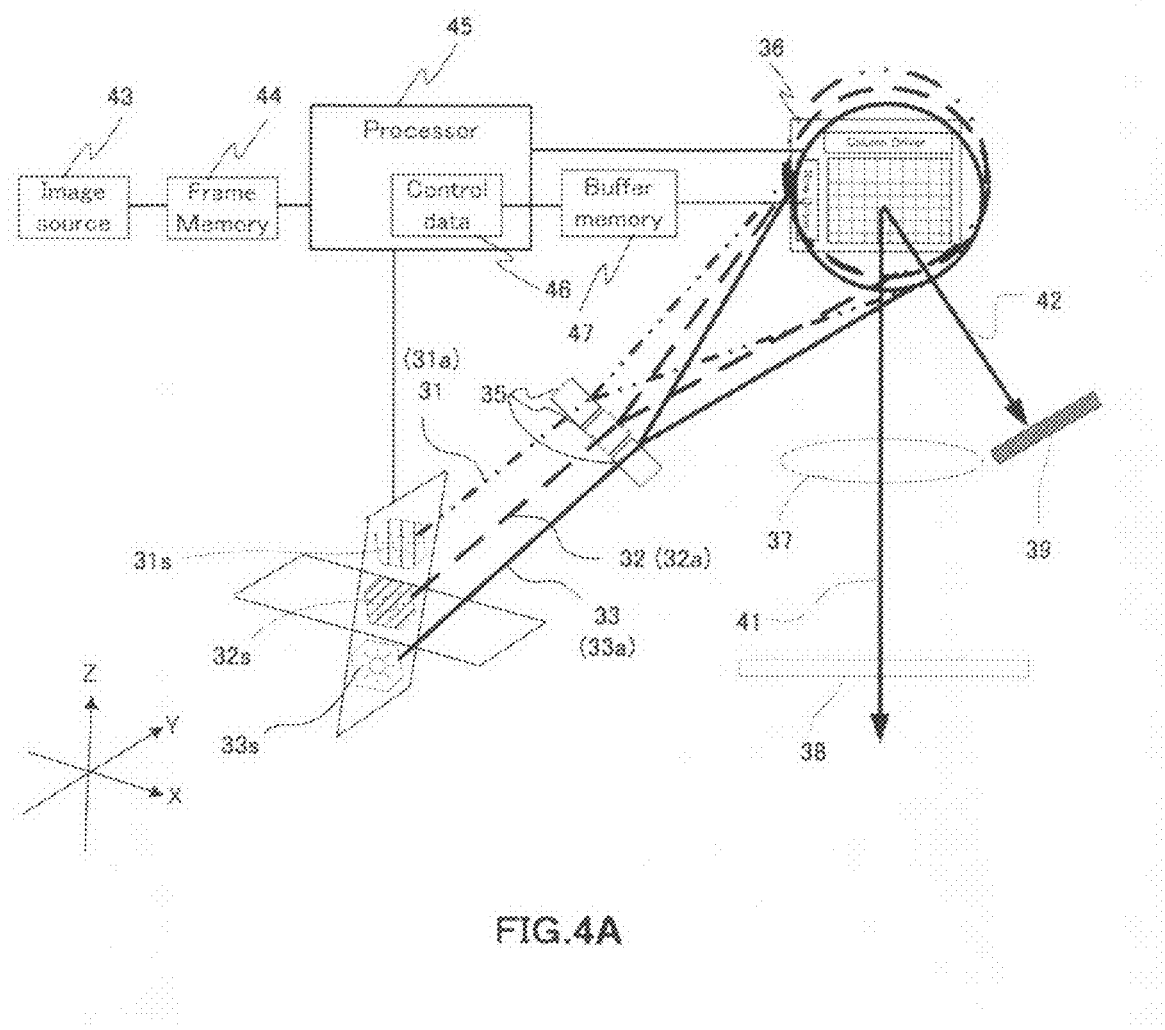
FIG. 4A is a diagram showing the change of placements of plural laser lights while having mutually different beam axes as a modified example of FIG. 3A.

FIG. 4A shows another exemplary embodiment of the present invention with the layout changed from a system shown in FIG. 3A. The individual laser light sources with different beam axes on the X-Y plane comprise different beam axes on the Y-Z plane. The individual laser light sources are now placed with the beam axes 31a, 32a and 33a of the plural laser light sources have different angles in a direction orthogonal to the mirror array surface of a deflection mirror device. Otherwise the overall configuration and principle of the projection display system are similar to the one described for FIG. 3 and therefore further detail description is not provided here.

Figure 4B:
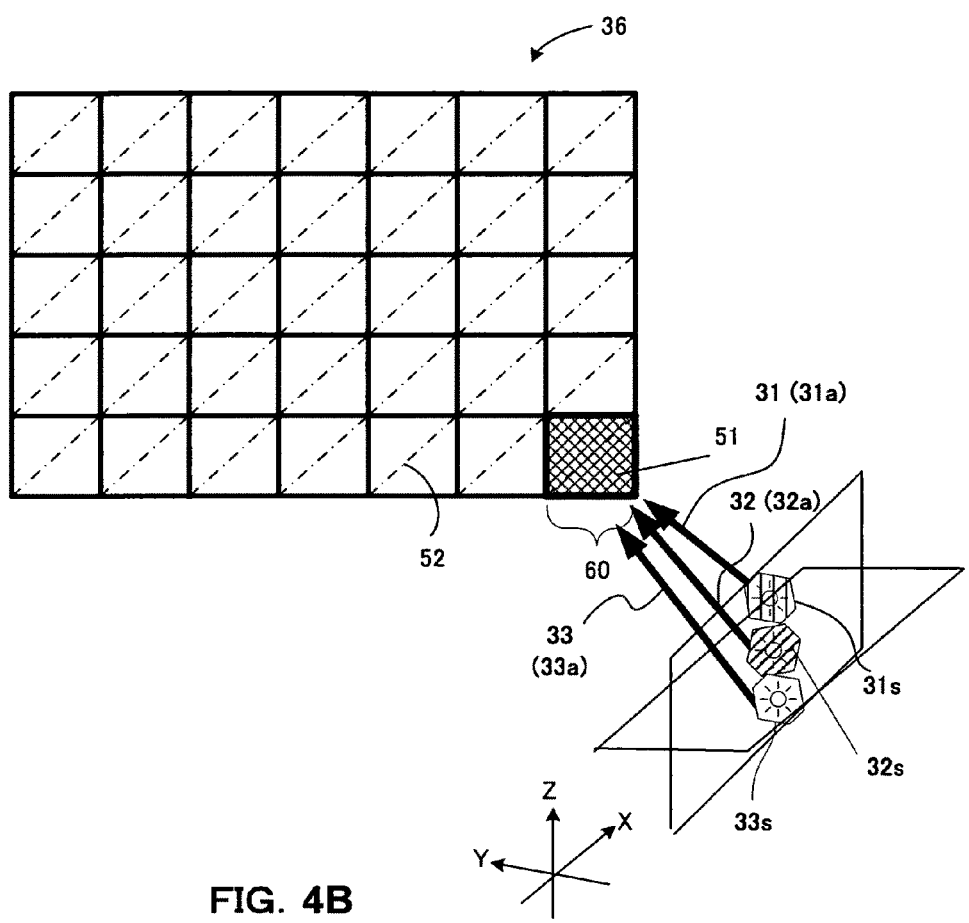
FIG. 4B illustrates the time of making the plural laser lights having mutually different beam axes shown in FIG. 4A incident to a deflection mirror device.

FIG. 4B illustrates the individual laser lights from the respective laser light sources with mutually different beam axes on the Y-Z plane of FIG. 4A are irradiated onto a deflection mirror device by way of an optical element (not specifically shown here) expanding the light beam of the respective laser lights. The deflection mirror device includes plural deflection mirror elements 60 with the inclination of the mirror surface relative to the deflection axis 52. The mirrors are controlled to operate in the ON state and OFF state by applying a voltage to the electrodes as shown and described for FIG. 3B. The inclination of the mirror surface is controlled to operate in the ON state for reflecting to the light path of the projection lens. The inclination of the mirror is controlled to operate in the OFF state for reflecting to the light path of the light dump and the laser lights are shielded, as shown and described in FIG. 3B.

Figure 4C:
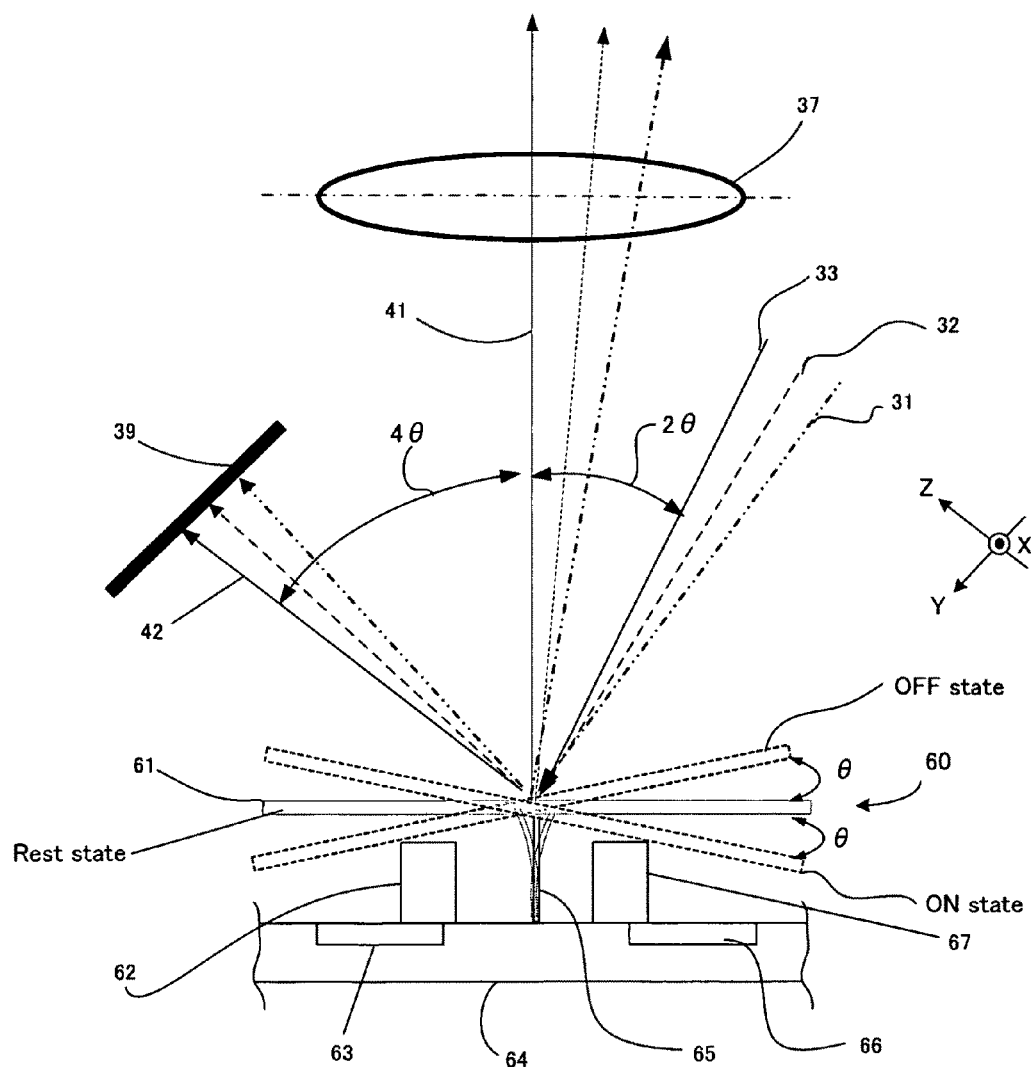
FIG. 4C depicts how the reflection light paths of the plural laser lights having mutually different beam axes shown in FIG. 4B are controlled by the inclination of the mirror surface of the deflection mirror elements constituting a deflection mirror device.

FIG. 4C depicts, in further detail, how one deflection mirror element of the deflection mirror device of FIG. 4B receives individual laser lights emitted from the respective laser light sources with mutually different beam axes on the Y-Z plane. The deflecting mirror reflects the respective laser lights toward the projection optical system or light dump as a result of controlling the mirror surface of the deflection mirror elements.

In FIG. 4C, the individual laser light beams 31, 32 and 33 emitted from the respective laser light sources have mutually different beam axes 31a, 32a and 33a on the Y-Z plane. The laser beams are expanded by an optical element and irradiate onto one deflection mirror element 60 of the deflection mirror device is the display system is configured such that the individual laser light beams 31, 32 and 33 projected to the numerical aperture NA with respectively different elliptical shape or elongated cross-sectional shapes. The laser light beams 31, 32 and 33 are projected from plural laser light sources. The mirror 61 of the deflection mirror element 60 is in the ON state, the individual laser light beams 31, 32 and 33 are reflected to the light path of the projection lens 37. Since the individual laser light beams 31, 32 and 33 have different beam axes 31a, 32a and 33a on the Y-Z plane before being reflected, they are reflected with respective shifts along the different beam axes 31a, 32a and 33a in the direction of the Y-Z plane. Meanwhile, when the inclination of the mirror surface of the deflection mirror element in the ON state represented by an inclination angle θ in relation to the mirror surface in the stationary state, the angle between the incident light path of the laser light and the projection light path 41 is 2θ based on the principle of reflection. When the inclination is in the OFF state, the individual laser light beams 31, 32 and 33 are reflected to the light path of the light dump 39 and are shielded therein. Since the individual laser light beams 31, 32 and 33 have different beam axes 31a, 32a and 33a on the Y-Z plane before being reflected, they are reflected with respective shifts along the different beam axes 31a, 32a and 33a in the direction of the Y-Z plane and are incident to the light dump 39. Meanwhile, when the inclination of the mirror surface of the deflection mirror element in the OFF state with an inclination angle represented by θ in relation to the mirror surface in the stationary state, the angle between the incident light path of the laser light and the light dump path 42 is 4θ based on the principle of reflection. The configuration of the deflection mirror element in this case is similar to that of FIG. 3C and therefore further description is not provided here.

Figure 4D:
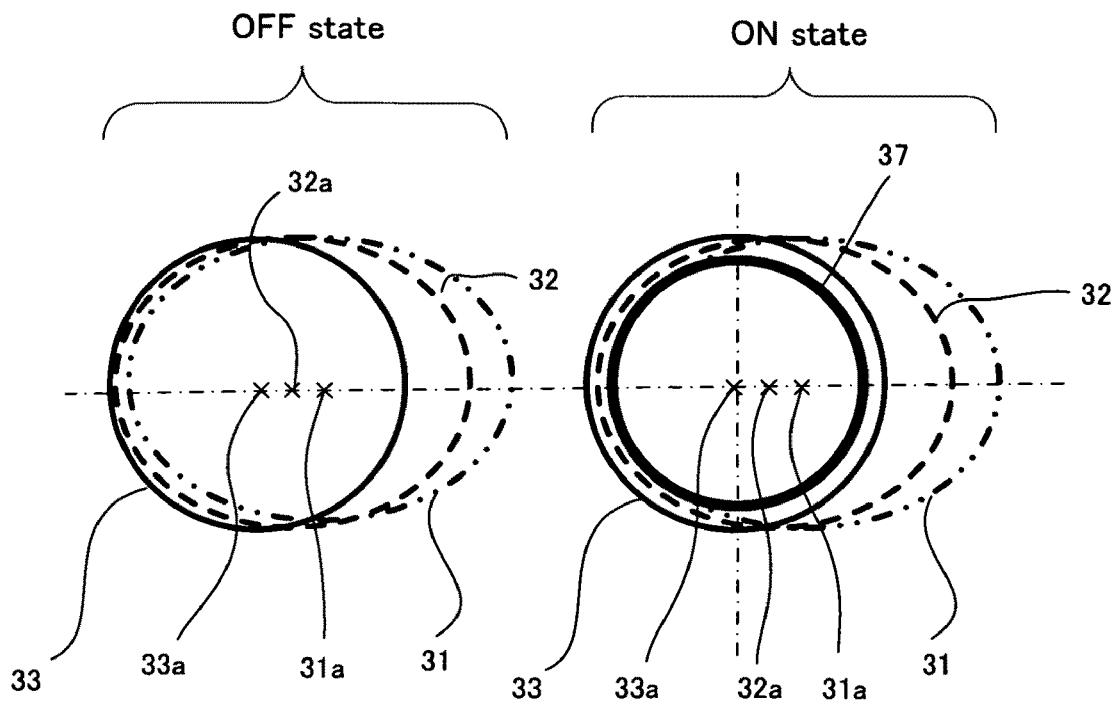
FIG. 4D is a cross-sectional diagram of the light beam of the plural laser light beams reflected by the deflection mirror elements of the deflection mirror device shown in FIG. 4C at the position of the pupil of a projection lens which is in the intermediate state and OFF state.
Figure 4E:
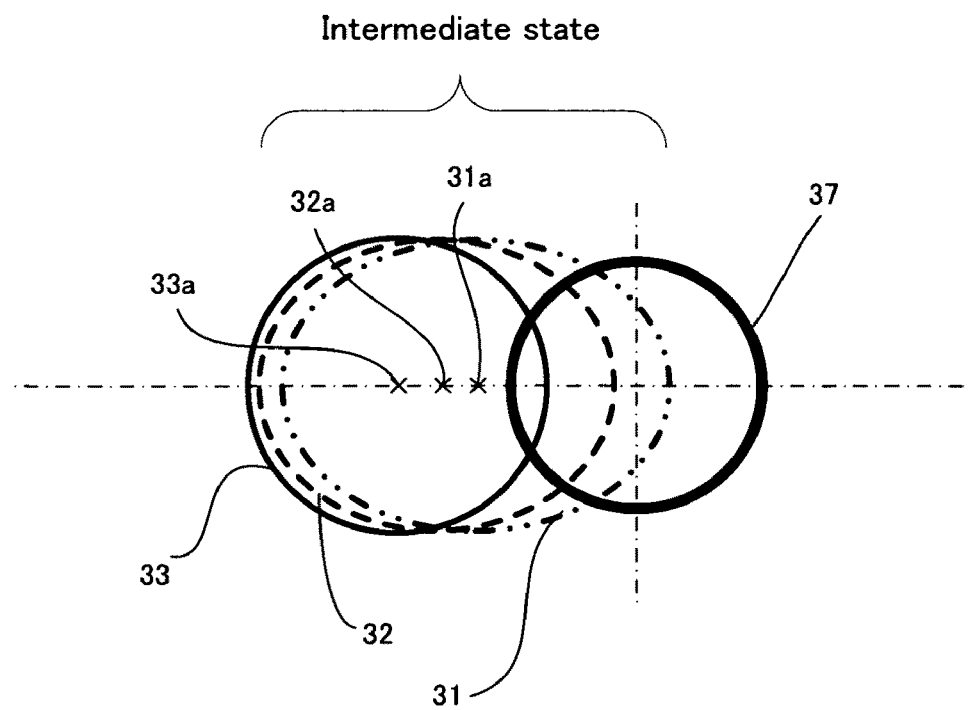
FIG. 4E is a cross-sectional diagram of the light beam of the plural laser light beams reflected by the deflection mirror elements of the deflection mirror device shown in FIG. 4C at the position of the pupil of a projection lens which is in the intermediate state.

FIGS. 4D and 4E are cross-sectional diagrams for illustrating the light beam of the individual laser light beams 31, 32 and 33 reflected by the deflection mirror element of the deflection mirror device shown in FIG. 4C at the pupil of a projection lens. The cross-sectional diagram of the light beam at the pupil shows the individual laser light beams 31, 32 and 33 have elliptical or elongated shapes with numerical aperture NA when incident to the projection lens 37 and cover the projection lens when the mirror is operated at an ON-state. The individual laser light beams 31, 32 and 33 projected from the plural laser light sources 31s, 32s and 33s have mutually different beam axes 31a, 32a and 33a on the Y-Z plane. It is also possible to adjust the intensity distribution of light, only in a prescribed direction of the reflection light beam of the individual laser light beams 31, 32 and 33 relative to the pupil diameter of the projection optical system, Although the light beam covers the entirety of the project lens 37, some portion of the respective laser light beams 31, 32 and 33 having enlarged numerical aperture NA in a prescribed direction relative to the pupil diameter of the projection optical system. The beams have an elliptical or elongated cross-sectional shapes, protrudes to the outside of the projection lens 37. The required light intensity of the respective laser light beams 31, 32 and 33 are produced within the range of the projection lens 37. It is further possible to create a configuration so that a portion of the blue light protrudes outside the projection lens so as to set blue at the darkest color and green at the brightest color. The color display is line with the vision characteristics of an observer. It is therefore preferable to set configure the display system to shift the beam axes 31 and 32a of the blue and red laser light beams 31 and 32 around the optical axis 33a of the green laser at the center.

In an exemplary embodiment, the individual laser light sources includes different beam axes 31a, 32a and 33a on the Y-Z plane. The individual laser light beams 31, 32 and 33 reflected by the deflection mirror device are shifted by the specific amounts on the Y-Z plane with different beam axes 31a, 32a and 33a. The specific shifts in the light beams of the respective laser lights provide the required light intensity for the respective laser light beams 31, 32 and 33 within the range of the projection lens 37. This is achieved because the individual laser light beams 31, 32 and 33 cover the entirety of the projection lens.

A laser light source is controlled to provide optical intensity of a reflection light to have different light intensity for different color. The individual laser light beams 31, 32 and 33 may not necessarily have to cover the entirety of the projection lens, or the laser light beams may be projected in different zones or area sizes within the pupil of the projection lens.

When the laser light beams 31, 32 and 33 projected from the plural laser light sources 31s, 32s and 33s comprise mutually different beam axes 31a, 32a and 33a are reflected onto different zones, or onto an irradiation range of the cross-sectional forms of light beams, the image can be displayed when the beams cover the entire area of the projection lens. Furthermore, with application of laser sources, sufficient display light intensity may be achieved during the ON-state of the mirror.

Likewise, in the cross-sectional diagram of the light beams shown in FIG. 4D at the pupil of the projection lens, the individual laser light beams 31, 32 and 33 are projected with elliptical or elongated cross-sectional shapes by the optical element expanding the individual laser lights from plural laser light sources. The laser light sources have mutually different beam axes 31a, 32a and 33a on the Y-Z plane. The light beams are reflected by the deflection mirror element 60 to the light path of the light dump 39 and away from the projection lens 37 when the inclination of the mirror surface of the deflection mirror element of the deflection mirror device is in the OFF state. Since the individual laser light sources 31s, 32s and 33s have the different beam axes 31a, 32a and 33a on the Y-Z plane, the individual laser light beams 31, 32 and 33 reflected by the deflection mirror device are reflected with specific shifts on the Y-Z plane. The lights beams are then shielded at the light dump 39 without generating a reflecting light and the problem of reflection interferences are prevented.

The deflection mirror element of the deflection mirror device is arranged such that the individual laser light beams 31, 32 and 33 illuminated by the optical element are reflected to cover the entirety of the projection lens in the ON state of the deflection mirror element. The individual laser light beams 31, 32 and 33 illuminated by the optical element are reflected away from the projection lens in the OFF state of the deflection mirror element. The ON state and OFF state of the deflection mirror element of the deflection mirror device is controlled by controlling the inclination angle of the mirror surface.

FIG. 4E depicts a cross-sectional diagram of the light beams 31, 32, and 32 at the pupil of a projection lens. The individual laser light beams 31, 32 and 33 are reflected when the inclination of the mirror surface of the deflection mirror elements of the deflection mirror device shown in FIG. 4C is in the intermediate state. The individual laser lights from the plural laser light sources have mutually different beam axes 31a, 32a and 33a on the Y-Z plane and the individual laser light beams 31, 32 and 33 are expanded to a beam with elliptical or elongated cross-section shapes by the optical element. The laser light beams are reflected by the deflection mirror element so as to partially incident to the projection lens when the inclination of the mirror surface of the deflection mirror element of the deflection mirror device is in the intermediate state. The fact that the individual laser light beams 31, 32 and 33 are partially incident to the projection lens 37 causes a smaller amount of light to exist than exists at the time of the ON state. The individual laser light beams 31, 32 and 33 passes through the entirety of the projection lens. With partial projection of the light beams transmitted through the projection lens, finer controllable adjustment of light intensity is achievable to tune the light intensity with a higher gradation. Furthermore, the laser light sources comprise the different beam axes 31a, 32a and 33a on the Y-Z plane. The individual laser light beams 31, 32 and 33 reflected by the deflection mirror device are reflected with specific shifts on the Y-Z plane. The ratios of the respective laser light beams 31, 32 and 33 passing through the projection lens 37 are different. The individual laser light beams 31, 32 and 33 in the OFF state shown in FIG. 4E are similar to those in the OFF state shown in FIG. 4D. The laser light beams 31, 32 and 33 in the intermediate state are further directed toward the projection lens than the position in the OFF state. The laser light source and an illumination optical element provide flexibility to arrange the optimal projection light intensity in the ON state of the deflection mirror element and to set the optimal fine projection light intensity in the oscillating state or intermediate state of the deflection mirror element.

Furthermore, with an embodiment broader ranges are configured for the numerical aperture NA of the illumination light beam in the deflection direction of the mirror surface of the deflection mirror element. This configuration makes it possible to change the light intensity of light transmitted through the pupil of the projection lens when the deflection mirror element is in the intermediate state.

Figure 5:
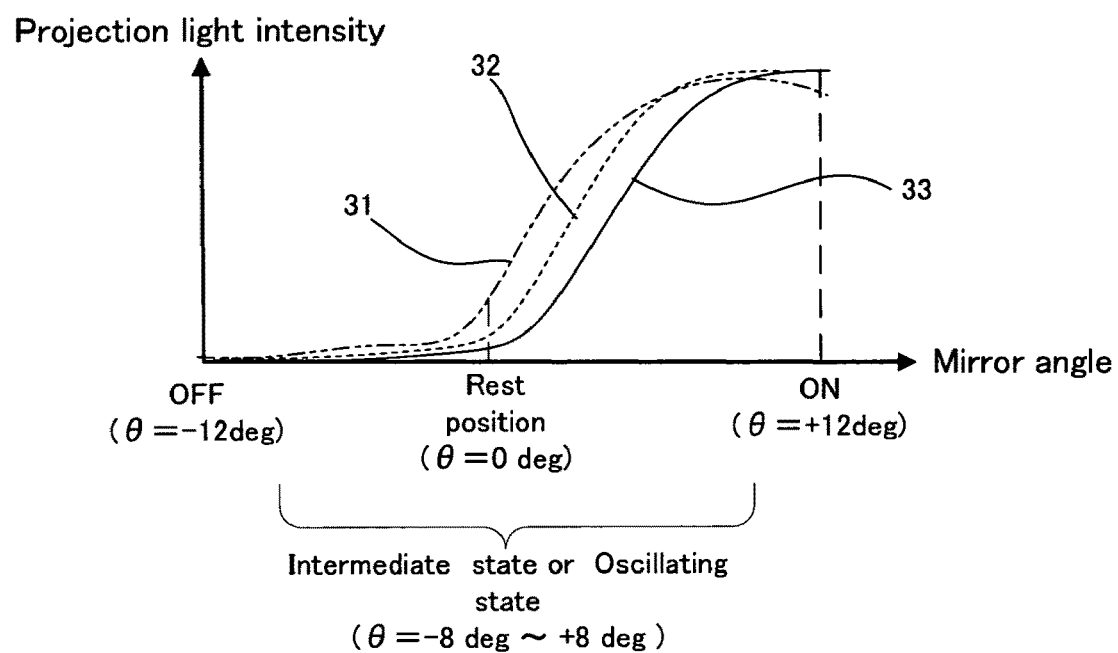
FIG. 5 is a graph illustrating the relationship between the inclination angles of the mirror surfaces of the deflection mirror elements of the deflection mirror device, which are shown in FIG. 4A through FIG. 4E, and the intensities of laser lights observed at a projection lens.

FIG. 5 is a diagram for illustrating the relationship between the inclination angle of the mirror surface of the deflection mirror element of the deflection mirror device and the intensities of laser lights at a projection lens. The incline angles of the mirrors are described for FIG. 3A through FIG. 3E and for FIG. 4A through FIG. 4E.

FIG. 5 shows the light intensity at the projection lens in the vertical axis and the inclination angle of the mirror surface of the deflection mirror element of the deflection mirror device in the horizontal axis. In the exemplary embodiment, the stationary state of the deflection mirror element is typically designated with a mirror with the inclination angle $\theta=0$ of the mirror surface.

When the mirror surface of the deflection mirror element is positioned at $\theta=-12$, a minimum light intensity is projected to the projection lens because the individual laser light beams 31, 32 and 33 are reflected to the light dump 39 and shielded therein. Therefore, at the time of the deflection mirror device being in the OFF state, there is zero or a minimal amount of light from all light sources being transmitted through the projection optical system. When the inclination angle $\theta$ of the mirror surface of the deflection mirror element is controlled to an angular position between $\theta=-8°$ through $+8°$ by operating the mirror in an intermediate state, the ratio of the light incident to the projection lens to the individual laser lights increases as the angle $\theta$ approaches the inclination angle $\theta=+12°$ of the ON state. In an oscillating state, the intensity of the individual laser light projects to the projection lens changes as the inclination angle of the mirror surface of the deflection mirror element freely oscillates between the ON state and OFF state. In the intermediate state or oscillating state, the light intensity of the reflection light of the laser light from the plural laser light sources reflected by the deflection mirror device transmitted through the projection optical system can easily be controlled by changing the inclination of the beam axes 31a, 32a and 33a of the illumination lights, the numerical apertures NA of the respective illumination lights and the emission intensities of the respective laser light sources. For the stationary state in the present embodiment when the inclination angle $\theta$ of the mirror surface is $\theta=0$, is also a part of the intermediate state. Therefore only a part of the individual laser lights reflected by the deflection mirror element are incident to the projection lens to project an intermediate light intensity. When the inclination angle $\theta$ of the mirror surface of the deflection mirror element is $\theta=+12°$ to operate at an ON state, the individual laser lights reflected by the deflection mirror element irradiate to cover the entirety of the projection lens, thereby making it possible to maximize the light intensity at the projection lens.

FIG. 5 shows an exemplary embodiment with the projection display system for modulating the light beams from plural laser light sources having mutually different beam axes 31a, 32a and 33a. FIGS. 3A and 4A of shows exemplary embodiments of placing plural laser light sources on the X-Y plane and Y-Z plane. These configuration can be flexibly altered. The plural laser light sources may be placed in any position in a space provided that they comprise mutually different beam axes 31a, 32a and 33a. These configurations allows for adjustments of the respective light beams incident to an optical element transmitting the beams.

The configuration of plural lasers have mutually different beam axes 31a, 32a and 33a thus eliminates the need for a mirror for converging individual laser lights into the same beam axis as seen in the conventional configuration. The configuration is simpler and is significant in terms of increasing the freedom of the design of a projection display system.

The plural laser light sources may include two or more semiconductor lasers of any of the wavelength ranges of approximately 540 nm±20 nm, 630 nm±20 nm and 460 nm±20 nm.

In determining the ratios of the laser light intensities for each of the plural laser light sources including the red, green and blue laser lights, a preferable ratio is to set at the ratio of green to blue at 10:1 or higher, the ratio of green to red at 3:1 or higher, or the ratio of red to blue at 3:1 or higher. The light source providing laser beam with such ratios providing optimum and clearer color images.

A description of a projection display system implemented with lasers sources that projects four kinds of mutually different beam axes are described below as an alternate embodiment.

Figure 6:
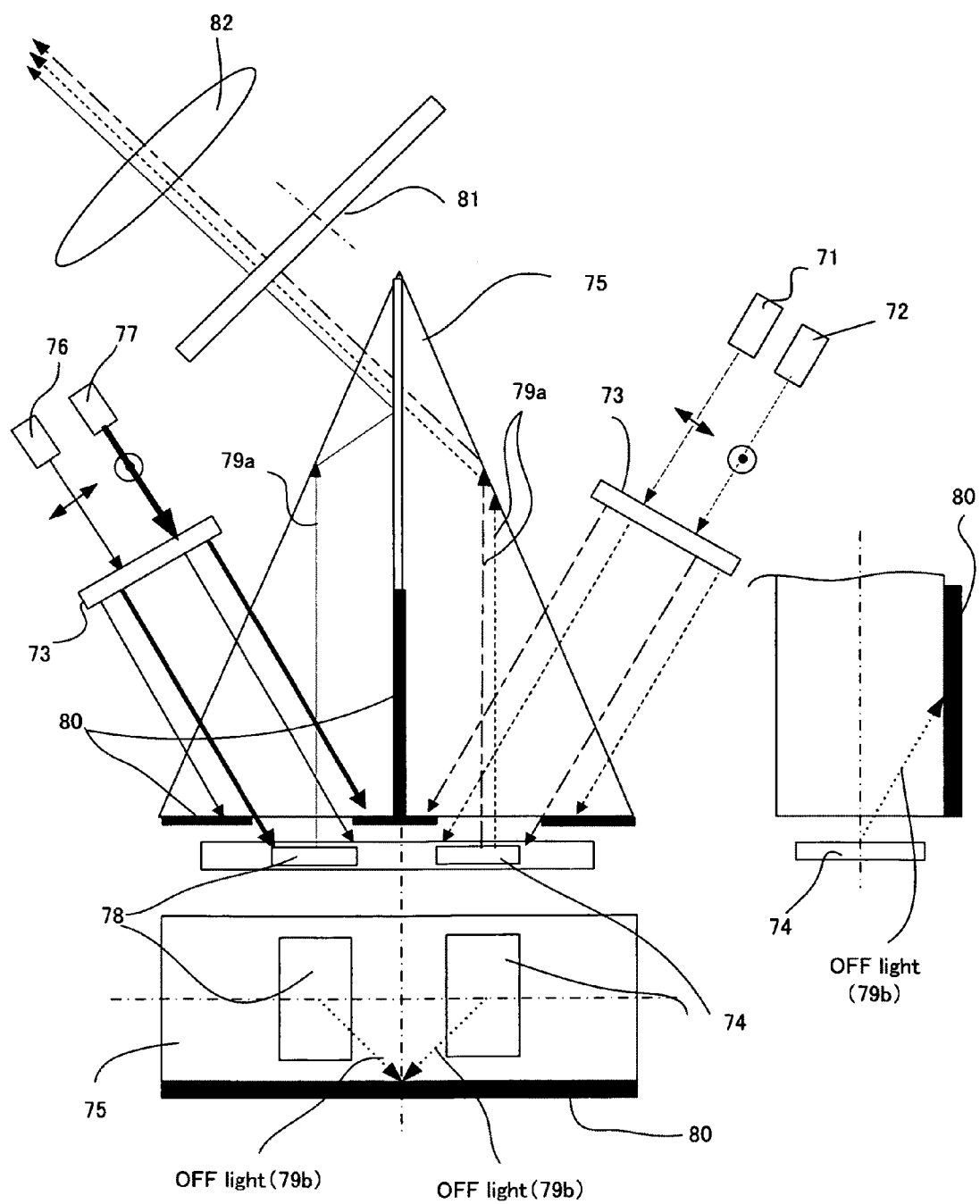
FIG. 6 is an overall configuration diagram of a display apparatus comprising two deflection mirror devices and laser light sources of red, green, light green and blue which have mutually different beam axes according to one preferred embodiment of the present invention.

FIG. 6 is a cross sectional view to show an overall configuration of a display apparatus that includes deflection mirror devices, and a red laser light source 71, a blue laser light source 72, a green laser light source 76 and a light green laser light source 77 which have different beam axes as one preferred embodiment of the present invention.

The optical system used for the projection display system according to the present embodiment is configured to use four illumination laser light sources, e.g., a red laser light source 71, a blue laser light source 72, a green laser light source 76 and a light green laser light source 77 as lasers having four kinds of different beam axes. The green laser light source 76 and light green laser light source 77 are laser light sources of approximately the same color. The beam axes are placed approximately in parallel. By using two laser light sources enables the system to display a video image with a range of color rendition changed, or to adjust the brightness adjusting these two light sources as approximately the light source of green color. The display system further comprises an optical element 73 for expanding the light beam of the individual laser lights and a dichroic prism 75. The prism has a configuration with two triangle prisms joined together. A color separation film for totally reflecting the green or light green wavelength and transmitting the red and blue lights are placed on the joined surface between these two prisms. Parts of the joined surface between the triangle prisms and that of the side surface are implemented as light dump 80. Deflection mirror devices 74 and 78 are disposed on the exit surface of the dichroic prism 75. The display system further includes a color switching filter 81 and a projection lens 82. The incident angle of the illumination light projected to the dichroic prism 75 further illustrates that an OFF light 79*b* is projected in a direction opposite to the direction of the reflection. Also, an optical prism (not specifically shown) is used for arranging appropriate incident angle relative to the surface for the illumination light to project into the dichroic prism 75.

A description of the principle for configuring the projection display system that includes the laser light sources having four different kinds of beam axes is described below.

The green laser light source 76 and the light green laser light source 77 have a polarization direction different from that of the green laser light source by 90 degrees. These lights enter the dichroic prism 75 from the left side of the dichroic prism 75. The illumination lights of the red laser light source 71 and the blue laser light source 72 having a polarization direction different from that of the red laser light source by 90 degrees and these lights enter from the right side of the dichroic prism 75. The green laser light source 76 and light green laser light source 77 are expanded by the optical element 73 and enter the dichroic prism 75. The light bumps 80 are disposed on the lower part of the joining part between the two joined prisms of the dichroic prism 75 and on a part of the surface before the incidence to the deflection mirror device 78. All of the incident laser light other than that entering the deflection mirror device 78 is shielded by the light bump 80. The green laser light and S-polarization light green laser light enter the deflection mirror device 78 have a P-polarization. The illumination light modulated and controlled by controlling the deflection mirror device 78 illustrated with only one solid line for representing a green laser light of a specific brightness by synthesizing the reflected green and light green. The ON lights 79*a* of the green laser light and light green laser light reflected by the deflection mirror device 78 are reflected by the slope surface of the dichroic prism 75. The reflected green and light green lights are further reflected by the joint surface of the two triangle prisms forming the dichroic prism 75. The ON light 79*a* of the green laser light or light green laser light are selectively projected to the projection lens 82 through the color switching filter 81. The color-switching filter 81 includes a dichroic filter, polarizing beam splitter (PBS) for selecting transmission or reflection in accordance with the wavelength or polarization state of a transmission light.

The light transmission sequence of the laser lights emitted from the red laser light source 71 and blue laser light source 72 on the right side of the dichroic prism 75 is described below. The laser light beams emitted from the red laser light source 71 and from the blue laser light source 72 are expanded by the optical element 73 and enter the dichroic prism 75. The light bumps 80 are disposed on the lower part of the joining part between the two joined prisms of the dichroic prism 75 and on a part of the surface before the incidence to the deflection mirror device 74. The incident laser light other than that entering the deflection mirror device 74 is shielded by the light bump 80. The green laser light with P-polarization and the blue laser light of a S-polarization are projected into the deflection mirror device 74. The ON lights 79*a* of the green laser light and blue laser light reflected by the deflection mirror device 74, are reflected by the slope surface of the dichroic prism 75. The reflected light is further reflected by the joint surface of the two triangle prisms forming the dichroic prism 75. The ON light 79*a* of the green laser light, or blue laser light are selectively, projected to the projection lens 82 through the color switching filter 81. The four kinds of laser lights, i.e., the green and light green laser lights incident from the left side of the prism and the red and blue laser lights incident from the right side of the prism, enter the projection lens 82 in a time sequential manner, to generate a color image. When the green and light green laser lights are set as a green laser light of the same wavelength, the combination of the red and blue laser lights to constitute a three-color laser light. The green light is projected continuously during one frame period while the red and blue lights are projected according to a time sequence with a display frame. The display configuration eliminates a flicker in the green video image thus provides a more visible color image. Further, the display period of green is longer than those of blue and red, all of which are projected in a time sequence. With a fixed brightness the display image become more visible because the green light has a higher visual sensitivity than the red and blue color lights. On the other hand, the control time for modulating a brightness gradation by applying the deflection mirror element increases with the length of the display period. It is therefore possible to increase the resolution of control in the deflection mirror element to display a smooth gradation at a higher tone. Furthermore, it is also possible to fix the transfer time of data to each mirror element by increasing the number of pixels of the deflection mirror element and by providing a high-resolution image such as 4 k by 2 k pixels. Moreover, the polarization light emitted from the laser light source may be reversed between the above described P-polarization and S-polarization or may be converted from the direct polarization into a circular polarization. A method capable of switching colors by changing the characteristic of the illumination light may also be used.

The bottom and top surfaces of the dichroic prism 75, which is not the light path of the incident and reflection lights of the ON light 79*a* are orthogonal to the joined surfaces of the two triangle prisms. The light dump 80 is disposed on the side surfaces of the prisms thus prevents the light to pass therethrough. The OFF light 79*b* is reflected to one direction and the individual lasers are absorbed by the light dump 80 when the deflection mirror elements on the deflection mirror device corresponding to the respective laser lights are in the OFF state.

As described above, plural laser light sources include at lease two color light sources. The plural laser light sources are controlled according to a time division scheme to differentiate the light intensity gradation for each color for displaying image. The projection display system is therefore configured with at least three light sources with at least two deflection mirror devices. Further, the difference in wavelengths of a part of plural light sources used for a projection display system, such as a difference of 5 nm and no more than 10 nm between the green and light green is disclosed in FIG. 6.

Figure 7A:
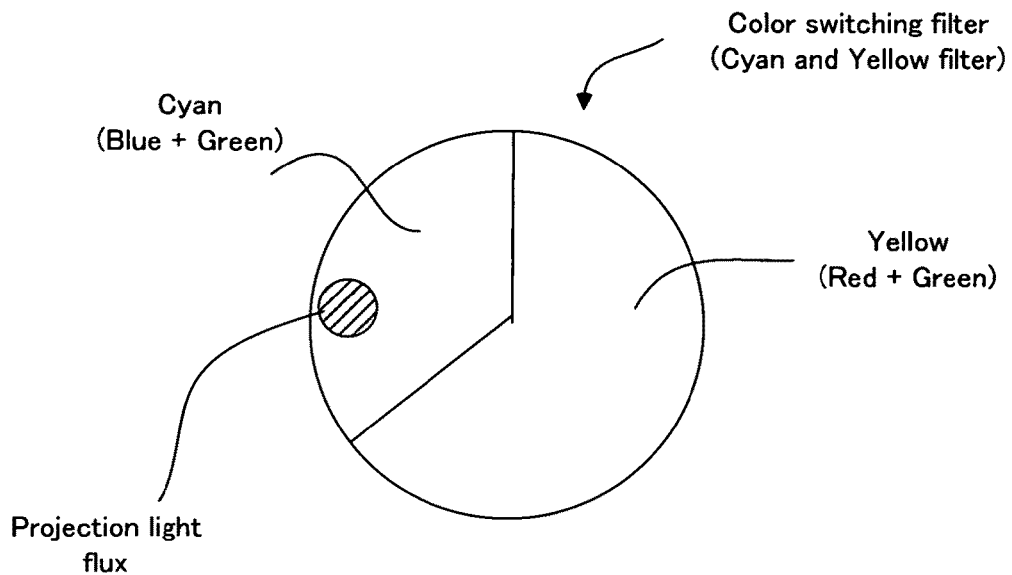
FIG. 7A depicts the employment of a color separation filter as the color switching filter used in FIG. 6 according to one preferred embodiment.
Figure 7B:
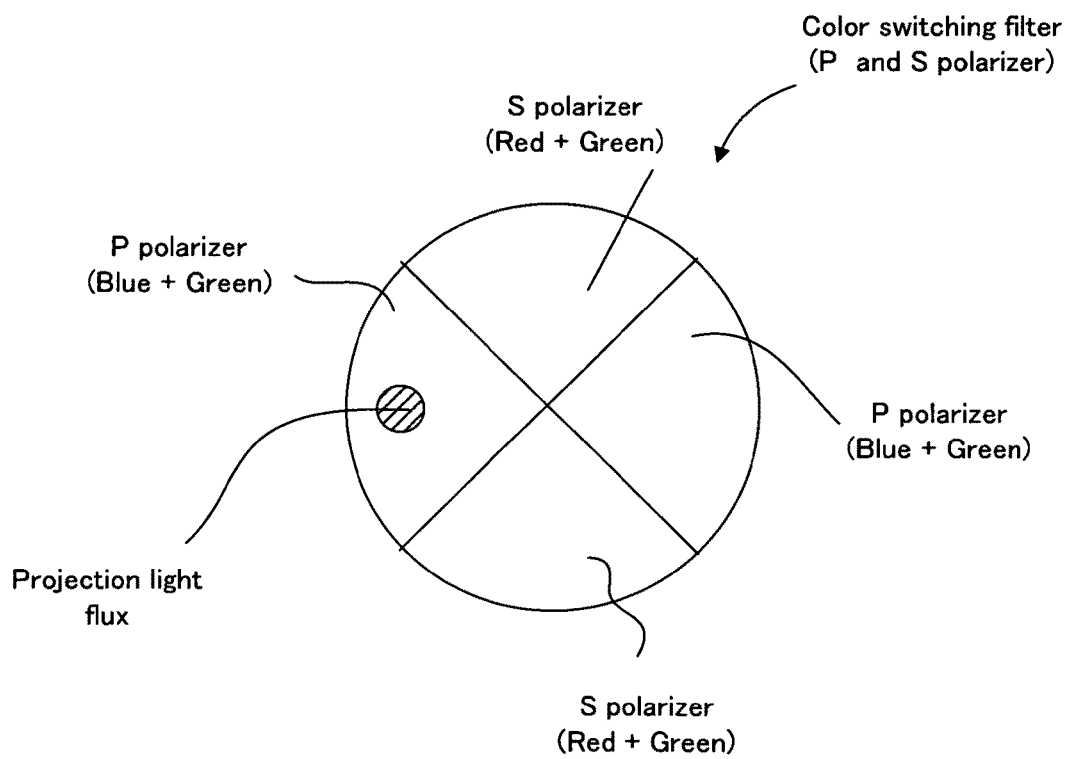
FIG. 7B depicts the employment of a deflection plate filter as the color switching filter used in FIG. 6 according to one preferred embodiment.

FIGS. 7A and 7B are diagrams showing the color separation filter used in FIG. 6 in detail. The green and light green are lights having approximately the same wavelength. lights are configured to be transmitted through cyan and yellow colored filters.

FIG. 7A is a diagram for illustrating a color separation filter comprising two colors, i.e., cyan color by mixing blue and green, and yellow color by mixing red and green. FIG. 7A shows the configuration for the projected light flux with the ratio of yellow greater than that of cyan in the color separation filter. The color of the color separation filter and the ratio of the color can be discretionary determined. In the color separation filter, when a laser light to be projected is irradiated in the diagonal hatching part, for example, the color of the part is projected.

Figure 8A:
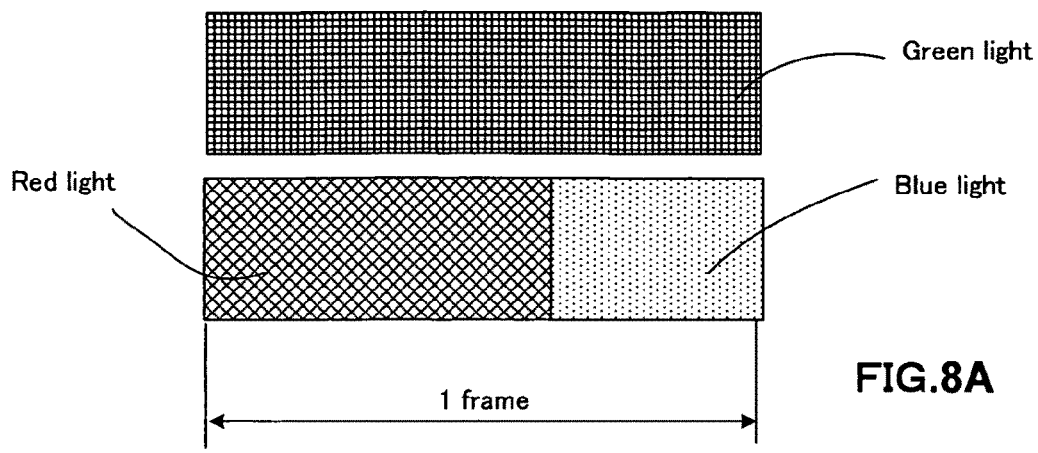
FIG. 8A shows the time of a sub-frame in the individual color laser corresponding to FIG. 7A according to one preferred embodiment.
Figure 8B:
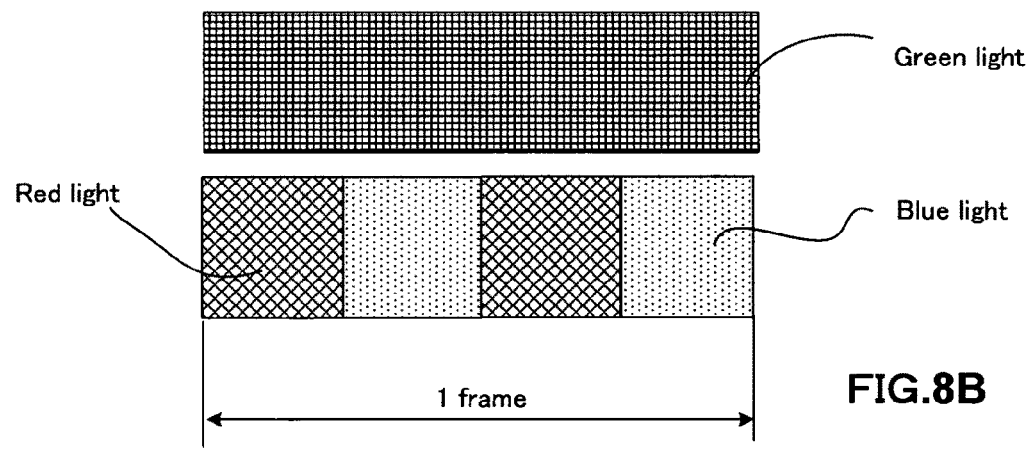
FIG. 8B shows the time of a sub-frame in the individual color laser corresponding to FIG. 7B according to one preferred embodiment.

FIG. 7B is a filter comprising a polarizing beam splitter (PBS) for the S-polarization and P-polarization to transmit two colors, e.g., cyan color by mixing blue and green, and yellow color by mixing red and green. In FIG. 7B, the ratio of S-polarization and P-polarization is set to be the same so that the ratio of yellow and that of cyan are the same in the PBS filter. Such a ratio occupied by the polarization in the PBS filter can be discretionarily determined. Because filters include both the S-polarization and P-polarization, a light of the S-polarization enters the P-polarization filter, the light is shielded. When a light of P-polarization enters the S-polarization filter, the light is likewise shielded. FIGS. 7A and 7B exemplify a color switching filter of a color wheel. The color wheel may be non-rotating color filter using a liquid crystal or materials or structures with similar functions. The reason is that the direction of the polarization axis of the filter changes in a rotating filter such as a color wheel particularly in the case of separating a color by utilizing polarization, thus degrading the transmission efficiency of the transmission light intensity. FIGS. 8A and 8B are diagram each shows the time duration of a sub-frame for each color corresponding to FIGS. 7A and 7B. The use of such time division schemes makes it possible to project a color image by projecting lights of different color in different periods. The effect of a color filter can be achieved by controlling, ON/OFF in a time division with the individual laser light sources synchronized with the deflection mirror device.

In FIG. 8A, a color corresponding to the color filter shown in FIG. 7A is projected according the time periods for irradiating the red light and blue light by time-dividing them within one frame in the ratio of colors corresponding to the color separation filter of FIG. 7A. By continuously irradiating the green light as the ON light onto the projection lens, that is similar to the plural laser light sources having a period of simultaneously irradiation shown in FIG. 6. As described above, a color image can be projected by controlling a projection with a period when plural laser light sources are simultaneously irradiated and in which the ON/OFF of the respective laser light sources are controlled according to a time division control scheme. The projection display system according to the present invention may be configured to expand the light beams of the laser lights from two laser light sources by using an optical element and to irradiate it onto the deflection mirror device so that either one laser light is modulated for the time period of ½ of one frame or longer. It may also be configured to expand the light beams of the laser lights from three laser light sources by using an optical element and to irradiate it onto the deflection mirror device so that either one laser light is modulated for the time period of ⅓ of one frame or shorter. Further, the combination of the display time and the light intensity of a laser illumination light can be controlled so as to correct the color balance and brightness balance of a screen image. The display times of respective colors may be flexibly adjusted for each frame by using the brightness and color information of the entirety of a screen image. In a screen image of a red sunset for example, if the red is abundant in the entirety of the screen, it is possible to extend the time for modulating the red laser light, displaying only red in 14 bits by increasing the gradation and displaying the gradations of green and blue in between 10 and 12 bits.

FIG. 8B is a timing diagram that shows a configuration to determine the lengths of time for irradiating the red light and blue light by performing a time division within one frame according to the ratio of colors corresponding to the polarization filter of FIG. 7B. The green light is maintained as ON light onto the projection lens as in the case of plural laser light sources having the time period of simultaneously irradiated in FIG. 6 to project a color image corresponding to the polarization filter of FIG. 7B.

The above description has disclosed imaged display system wherein a color image projected from laser light sources having four kinds of mutually different beam axes.

Figure 9:
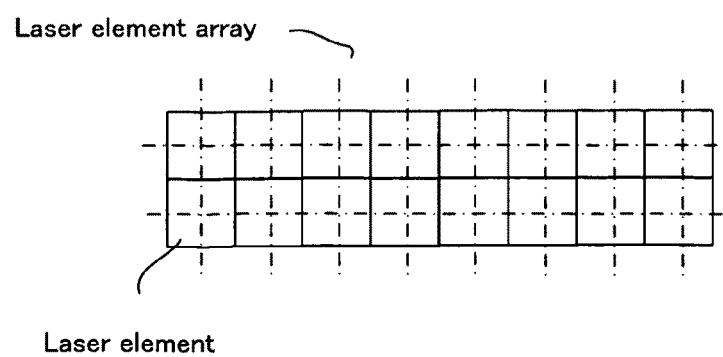
FIG. 9 shows one laser light source used for the projection display system according to the present invention being constituted by a plurality of laser elements arrayed in a two-dimensional array.

FIG. 9 shows the situation of a laser light source comprising plural laser elements lined up in a two-dimensional array.

As shown in FIG. 9, the configuration of a single laser light source includes plural laser elements to increase the light intensity of the laser light source. The light source provides an improved laser light source for a projection display system. The plural laser elements are configured to line up in a two-dimensional array vertically and horizontally. The two-dimensional array of laser elements may have a different wavelength in each area for placement of plural laser elements. An alternative configuration is to configure the laser lights of different colors having slightly different beam axes. Furthermore, a single laser light source may be configured by lining up a two-dimensional array of plural laser elements of the same color with slightly different wavelengths. The difference of wavelength is approximately ±1.5 nm. There is approximately 3 nm between lasers of substantially the same color. The green wavelengths of 520 to 560 nm may be adjusted by ON- and OFF-controlling individual laser elements having a difference in wavelength of approximately ±1.5 nm. Alternatively, the plural laser light sources may be implemented with LED light sources with a wavelength differences of approximately half the value of the wavelength of an LED light source. Furthermore, a circuit may be implemented to control the emission independently for each laser element or for each of these plurality of laser elements.

A deflection mirror device that may be implemented for each of the above-discussed embodiments of the projection display system is described below. The deflection mirror device according to the present invention includes plural deflection mirror elements for modulating mutually different laser light beams according to a time division scheme. Each deflection mirror element is controlled to operate in an ON state for reflecting a light beams illuminating on the deflection mirror element toward a projection optical system. In an OFF state, the mirror reflects the light beam away from the projection optical system. The mirror operates also in an intermediate state for reflecting the light beam partially to the projection optical system. The mirror may also operate in an oscillating state for repeating an oscillation between the ON state and OFF state. The detail configuration and operational processes for each of the plural deflection mirror elements included in the deflection mirror device is described below.

Figure 10:
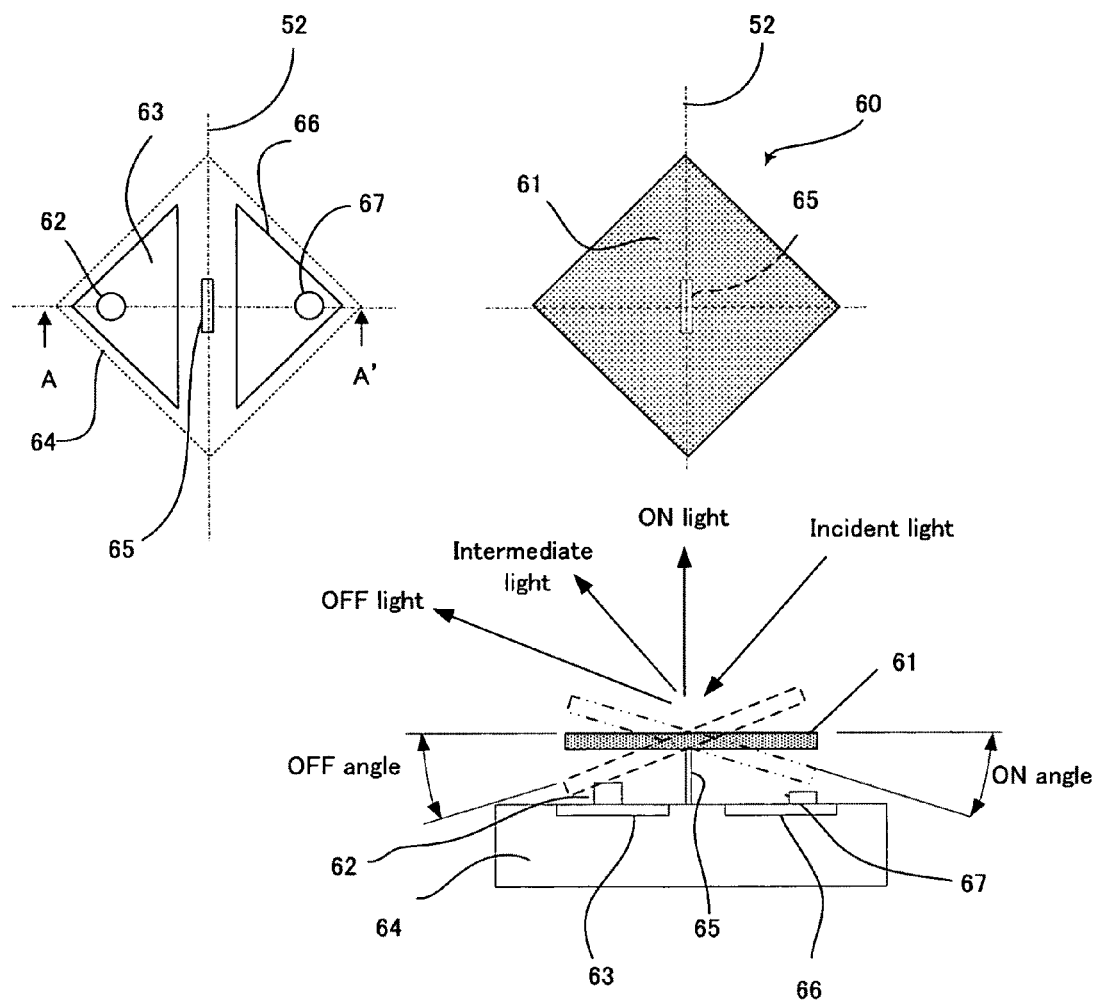
FIG. 10 shows a configuration example of one deflection mirror element of a deflection mirror device.

FIG. 10 is a diagram for showing a configuration of one deflection mirror element.

FIG. 10 shows the mirror 61 along with an elastic hinge 65 of the deflection mirror element on the top right side and the deflection mirror element with the mirror 61 removed on the top left side. The bottom side of FIG. 10 shows the A-A' cross-section of the deflection mirror element along with the mirror 61. The deflection mirror element shown in FIG. 10 is includes an OFF stopper 62 and an ON stopper 67, an OFF electrode 63 and an ON electrode 66. The distance from the ON stopper 67 to the deflection axis 52 is the same as that from the OFF stopper 62 to the deflection axis 52. Meanwhile, the height of the ON stopper 67 is configured to be smaller than that of the OFF stopper 62.

With such a configuration, an application of a prescribed voltage to the ON electrode 66 controls the mirror to operate in the ON state. The mirror 61 is tilted until come into contact with the ON stopper 67 for reflecting the incident light to the projection lens. By applying a prescribed voltage to the OFF electrode 63 controls the mirror to operated in the OFF state and causes the mirror 61 to tilt until come into contact the OFF stopper 62 for reflecting the incident light away from the projection lens. Further, by terminating the voltage applied to the OFF electrode 63 when the mirror 61 is in the OFF state controls the mirror to operate in the oscillating state causes the mirror 61 to a freely oscillate for reflecting the incident light in a direction in accordance with the oscillating state of the mirror 61. The exemplary embodiment set the inclination anglesite, the ON angle of the mirror 61 in the ON state to +12 degrees and the inclination angle, i.e., the OFF angle, of the mirror 61 in the OFF state to −8 degrees. The free oscillation in the oscillating state described above can be configured to perform a free oscillation at ±8 degrees. These inclination angles of the mirror may be set differently between the ON state and OFF state, such as at +14 degrees for the ON angle and −12 degrees for the OFF angle. In this embodiment, the height of the ON stopper 67 is smaller than that of the OFF stopper 62, thereby making the incident angle of the incident light larger than in the case of configuring the height of the ON stopper 67 to be the same as that of the OFF stopper 62.

An alternative configuration may have the mirror 61 shifts from the ON state to an oscillating state by decreasing the height of the OFF stopper 62 and terminating the voltage applied to the ON electrode when the mirror is controlled to operate in an ON-state.

In the deflection mirror element that reflects 80% or more of the illumination light beam from one laser light source to the pupil of the projection optical system, the mirror 61 is able to project practically the entirety, or only a part, of the remaining 20% of the light by placing the deflection mirror element in the intermediate state or oscillating state. The mirror may be controlled to provide an increased gradation of brightness for image display by utilizing a finer light intensity adjustment of ¼ to ⅕ light intensity increments of that of the ON state.

The deflection mirror element of the deflection mirror device may further controls the intensity of light reflected to the pupil of the projection optical system from the plural laser light sources with different colors. The intensity of light for different colors is controlled corresponding to the visual sensitivity characteristic of the color. The relationship between a intensity of energy and the intensity of light at 555 nm, the wavelength of the highest relative visibility, is that an optical energy of 1 watt is equivalent to a light beam of 683 lumens, with the relationship varying with wavelength. When there is an optical energy of 1 watts of a green laser and by refer to a visual sensitivity distribution, it is preferable to have 0.4 watts or less for a red laser of 620 nm to 640 nm and 0.1 watts or less for a blue laser of 480 nm to 450 nm. In terms of the ratios, the green to red is between 2:1 and 5:1, and the green to blue is between 10:1 and 20:1. In this event, it is desirable to optimize the emission light intensity of each laser light source by adjusting the display intensities so that the projected screen image matches with the visual sensitivity characteristic, with a suitable optical intensity ratio.

The beam axis of each laser is further arranged to produce optical intensity of the laser light beam reflected from the deflection mirror element and projected the pupil of the projection optical system corresponds to the visual sensitivity characteristic when the deflection mirror element is in the ON state.

It is further preferable to configure one deflection mirror element of the deflection mirror device as an approximate square with each side being 4 to 14 micrometers and the gap between the individual deflection mirror elements being 0.1 to 0.55 micrometers. The reflectance ratio of the laser light beam is different for each color of each laser light source. It is further desirable to arrange the effective area size of the mirror and the loss of the reflection light due to diffraction light caused by the gap between deflection mirror elements on the basis of the reflectance ratio of the mirror.

It may also be preferable to configure one deflection mirror element of the deflection mirror device as an approximate square with each side being 4 to 12 micrometers and to control the mirror for the light beam transmitted through the pupil of the projection lens to include the diffraction light from the mirror of the deflection mirror element. When the deflection mirror is miniaturized with the pitch between the respective deflection mirror elements reduced, the angle and optical intensity of diffraction light are also changed. Therefore, it is also preferable to determine the numerical aperture NA of the illumination light beam, and the emission light intensity of a laser light source by taking into consideration of the diffraction light.

Figure 11A:
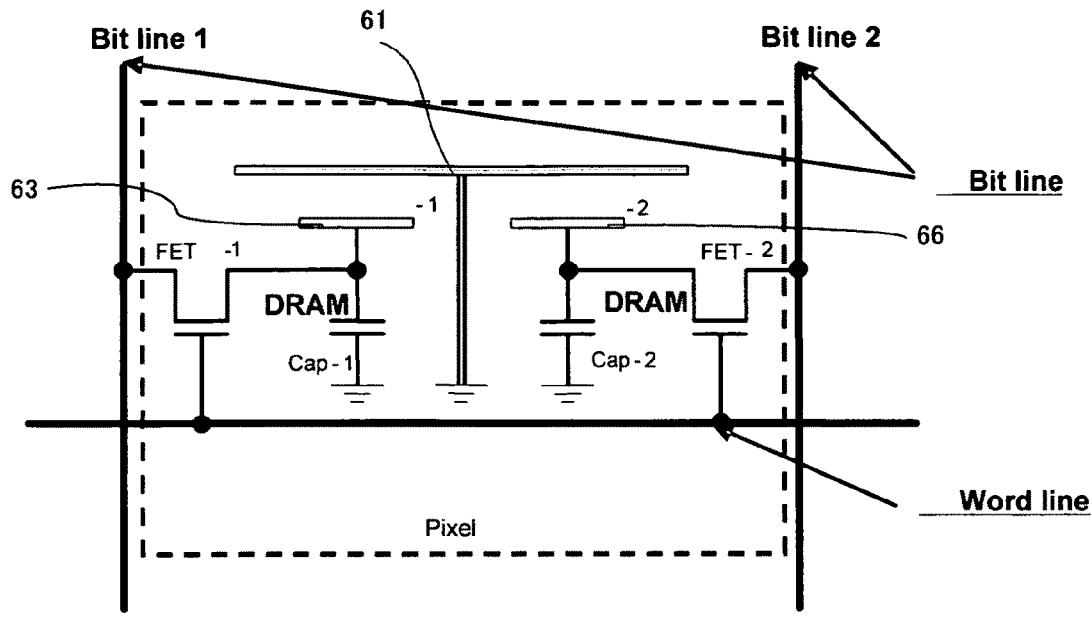
FIG. 11A shows the configuration of a control circuit used for each deflection mirror element shown in FIG. 10.

FIG. 11A shows the configuration of the control circuit for each deflection mirror element. FIG. 11A shows two Bit lines correspond to two lines of a column signal described above, and a Word line corresponds to one line of a row signal described above. In FIG. 11A, a field effect transistor (FET)-1 is connected between Electrode-1 63 and Bit line 1/Word line, and a capacitance Cap 1 is connected between the Electrode-1 63 and ground (GND). Likewise, FET-2 is connected between an Electrode-2 66 and Bit line 2/Word line, and a capacitance Cap-2 is connected between the Electrode-2 66 and GND. By applying a prescribed voltage to the Electrode-1 63 and by controlling the signal of Bit line 1 and Word line control the mirror 61 to incline toward the Electrode-1 63. Likewise, by applying a prescribed voltage to Electrode-2 66 and by controlling the signal of Bit line 2 and Word line control the mirror 61 to incline toward Electrode-2 66. Incidentally, in FIG. 12 as described below, each Bit line is disposed with an amplifier (Amp). The output voltage of each Column line is controlled by the output voltage signal of the Gain control circuit. A change the voltage applied to the Electrode for each mirror pixel also changes the electrostatic force for deflecting the mirror.

Figure 11B:
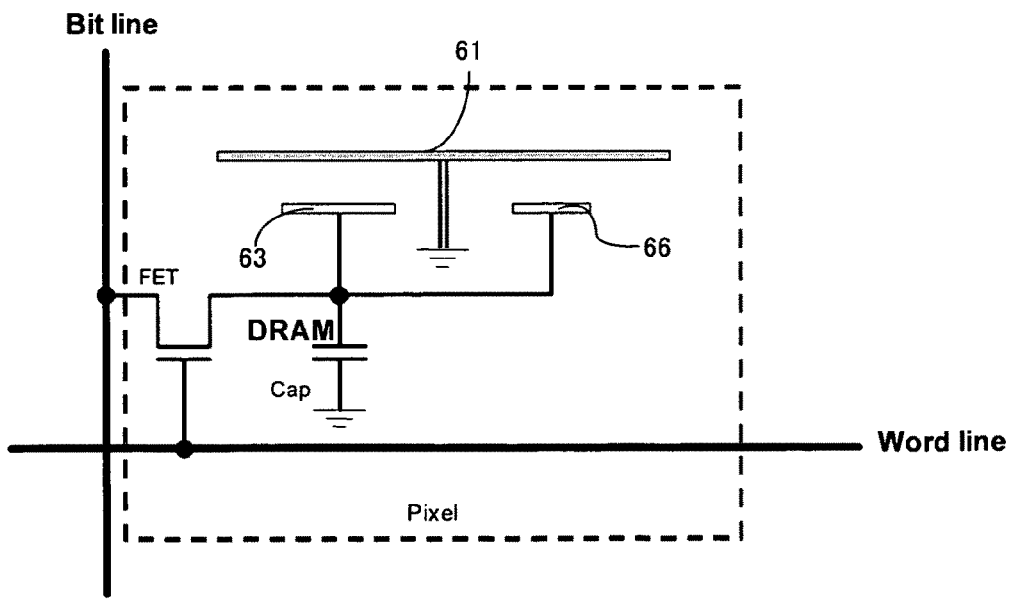
FIG. 11B shows a modified example of the configuration of a control circuit used for each deflection mirror element shown in FIG. 11A.

FIG. 11B shows an alternate configuration of a control circuit used for each deflection mirror element shown in FIG. 11A. The control circuit has one electrode for controlling one deflection mirror to place the electrode straddling the ON direction and OFF direction of the mirror. It is further configured to have one wire for transferring data to one deflection mirror element. With this circuit configuration and making the area size, height and the electrode asymmetrical between left and right sides of the elastic hinge part, it is achievable to control the inclination of the mirror surface of the deflection mirror element. As an example, the area size of the left and right electrodes is made to be different in the elastic hinge. An electrode with the larger area size is implemented for the OFF state. The method for controlling the mirror of the deflection mirror element in the OFF state from the initial state and for controlling it in the ON state is by applying a voltage to the address electrode in the initial state in which a voltage is not applied to one address electrode. The voltage applied to the address electrode causes the mirror to incline toward the large area of the address electrode, thereby bringing about the OFF state. The Coulomb force F is expressed by the following expression (1). Accordingly, the distance between the mirror and address electrode is the same in the OFF-side electrode part of the ON-side electrode part when the address electrode is in the initial state. The OFF state side of the address electrode with a larger area is capable of retaining a larger amount of change than the ON state side of the address electrode with a smaller area and accordingly generating a larger coulomb force:

$$F = \frac{1}{4\pi r^2} \cdot \frac{1}{\varepsilon} q_1 q_2, \quad (1)$$

where r is the distance between the address electrode and mirror, $\varepsilon$ is permittivity, $q_1$ and $q_2$ are charge amounts.

The action for changing a micromirror from the OFF state to the ON state is described below. The mirror inclined to the OFF state from the initial state is controlled in a free oscillating state by changing the voltage of the address electrode temporarily to "0" volts. In the free oscillating state, a voltage is applied at an appropriate time when the mirror approaches the electrode part where the area of the address electrode on the ON side is small makes it possible to retain the mirror on the ON side. The second power of the distance r has more effect when compared to the charge amounts $q_1$ and $q_2$ in the Coulomb force F according to Equation (1). An appropriate adjustment of the size of the ON side and OFF side of the address electrode causes the Coulomb force F to operate stronger on the side where the distance r between the address electrode and mirror is smaller. It is achievable to incline the mirror to the ON light side despite the fact that the area of the electrode part on the ON side of the address electrode is smaller than that of the electrode part on the OFF side.

The configuration with the address electrode and wiring are integrated as one as described above, it is achievable to control the mirror to operate in the ON light state by controlling the mirror operated in the OFF light state as an initial state.

Alternatively, the voltage applied to the address electrode to control the mirror may be applied in multiple stages.

A change in the voltages of the address electrode to "0" volts following a continuation of a certain state by retaining the ON state or OFF state by applying a voltage to the address electrode causes the mirror to operate in a free oscillating state. By applying a voltage lower than the voltage applied for the initial state at an appropriate time when the distance between the address electrode and mirror is closer to the ON direction while the free-oscillating mirror is moving from the ON side toward the OFF side makes it possible to control the mirror under the ON light state. Therefore, when the distance between the mirror and electrode is short and the mirror of the deflection mirror element is performing a free oscillation, the mirror can be controlled by a voltage lower than that for inclining the mirror from the initial stationary state to the ON state or OFF state. Accordingly, the configuration may be implemented with three level of voltages or more on the address electrode to control the deflection mirror element when the address electrode and wiring are integrated as one.

Furthermore, the timing for controlling the deflection mirror element may be matched with the control timing for driving the laser light source. Coordinated control timings enable more convenient control of the optical intensity of the display image by adjusting the optical intensity of the light source in line with the deflection state of the mirror. Higher level of intensity adjustment levels for increased number of grayscales is achievable.

Figure 12:
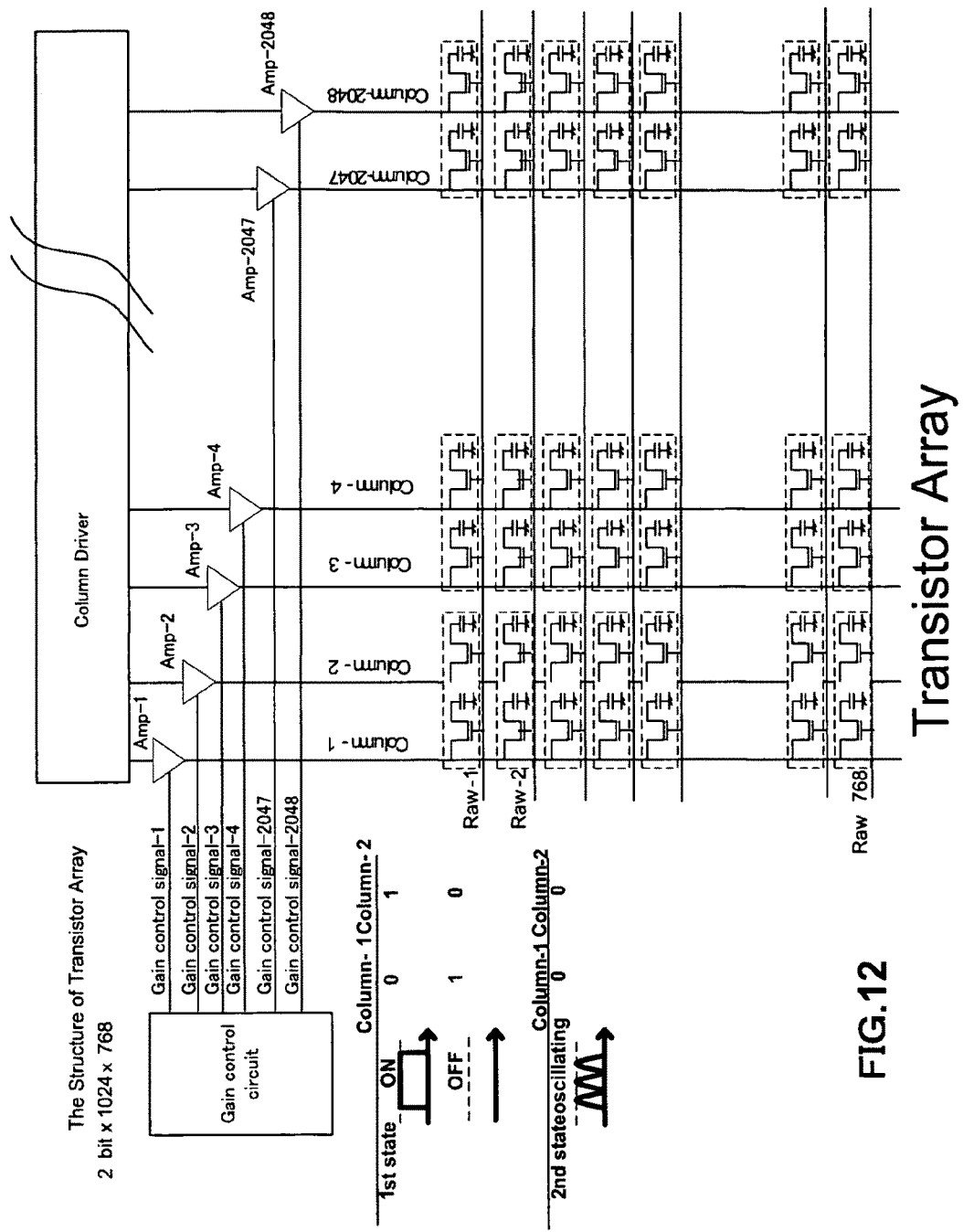
FIG. 12 shows the structure of a transistor array of a control circuit used for a deflection mirror device.

FIG. 12 is a diagram showing the structure of a transistor array of a control circuit used for controlling a deflection mirror device. FIG. 12 exemplifies a transistor array of a 2-bit×1024×768 structure. Each of the parts enclosed by the dotted lines corresponds to a deflection mirror element. Each deflection mirror element is controlled by two Column signals and one Row signal. The deflection mirror element at the top left of the drawing is controlled by the Column-1 signal, Column-2 signal and Row-1 signal. More specifically, by applying a prescribed voltage to the Row-1 signal the mirror is switched to the ON state if the Column-1 signal is "0" and the Column-2 signal is "1". The mirror is switched to the OFF state when Column-1 signal is "1" and the Column-2 signal is "0". The mirror controlled to operate in the oscillating state when the Column-1 signal is "0" and the Column-2 signal is "0" when the mirror is in the OFF state.

Figure 13A:
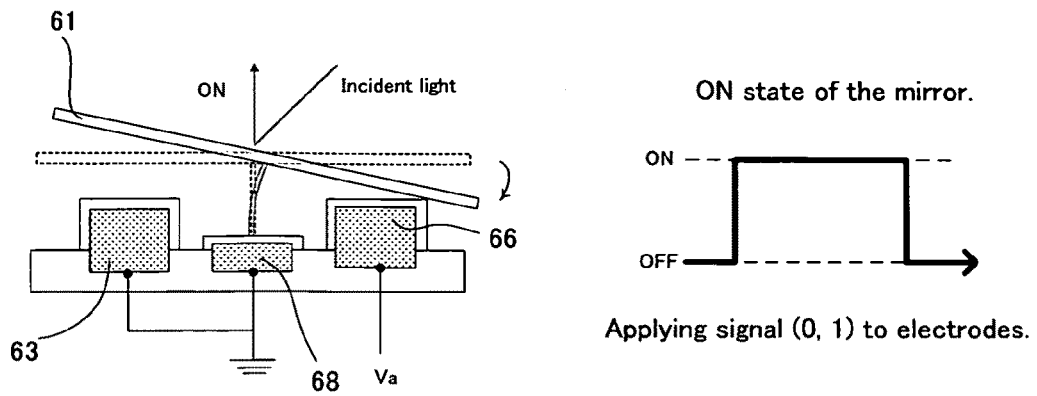
FIG. 13A illustrates an example of a micromirror at an ON state which reflects incoming light fully.
Figure 13B:
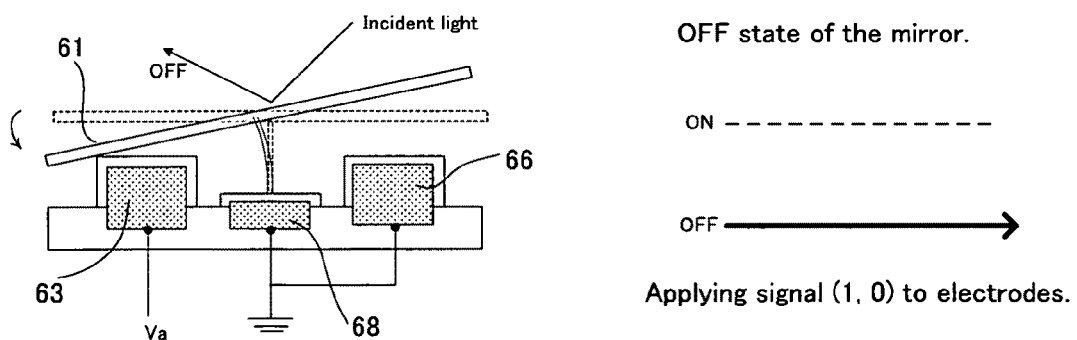
FIG. 13B illustrates an example of a micromirror at an OFF state which does not reflect incoming light.

The reflectance can be changed with mirror angles as illustrated in FIGS. 13A and 13B. The ON position of a mirror is usually designed as the position that provides the maximum brightness and the OFF position is to provide the minimum brightness within the drivable range of angles. By keeping mirrors in the condition to reflect light partially a sub-LSB brightness is controllable to increase the number of levels of the grayscale.

In conventional systems, a mirror is driven to an ON position with (0,1) signal to the electrodes beneath the mirror, wherein (0,1) is defined as zero volt is applied to the left electrode and an ON voltage is applied to the right electrode as illustrated in FIG. 13A. (1, 0) will be applied to drive the mirror to an OFF position.

Figure 1A:
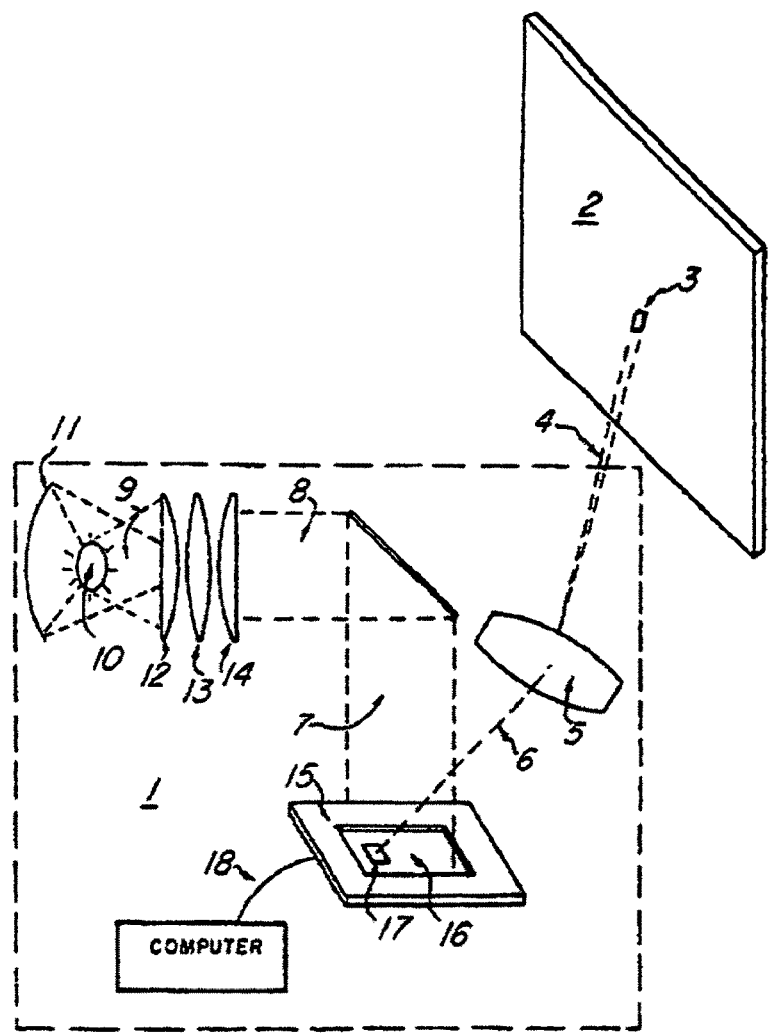
FIG. 1A show a prior art illustrating the basic principle of a projection display using a micromirror device.
Figure 1B:
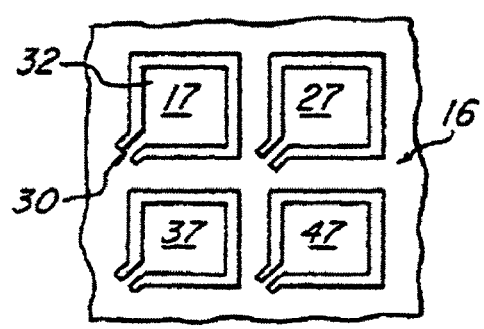
FIG. 1B show a prior art illustrating the basic principle of a micromirror device used for a projection display.
Figure 1C:
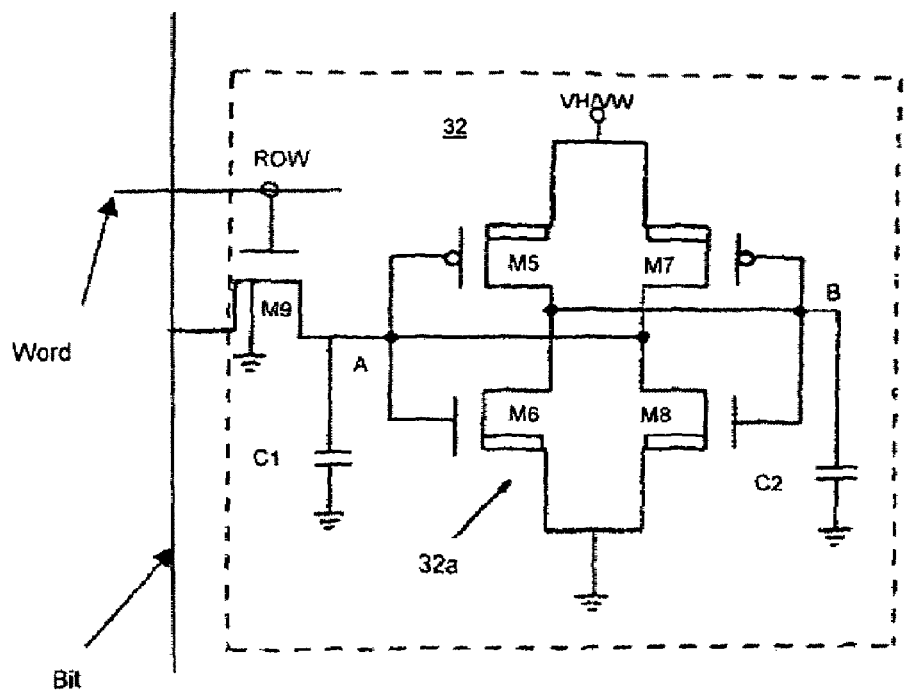
FIG. 1C shows an example of the driving circuit of prior arts.
Figure 1D:
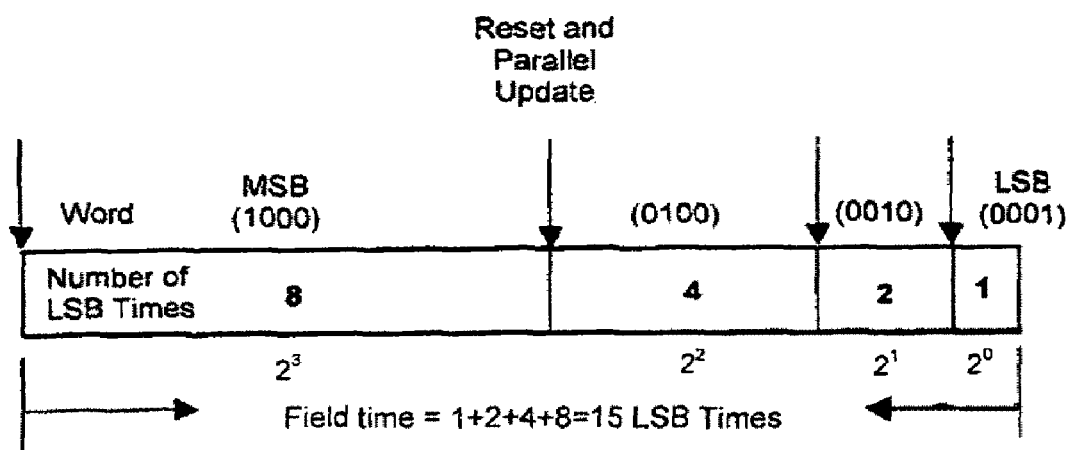
FIG. 1D shows the scheme of Binary Pulse Width Modulation (Binary PWM) of conventional digital micromirrors to generate grayscale.
Figure 2:
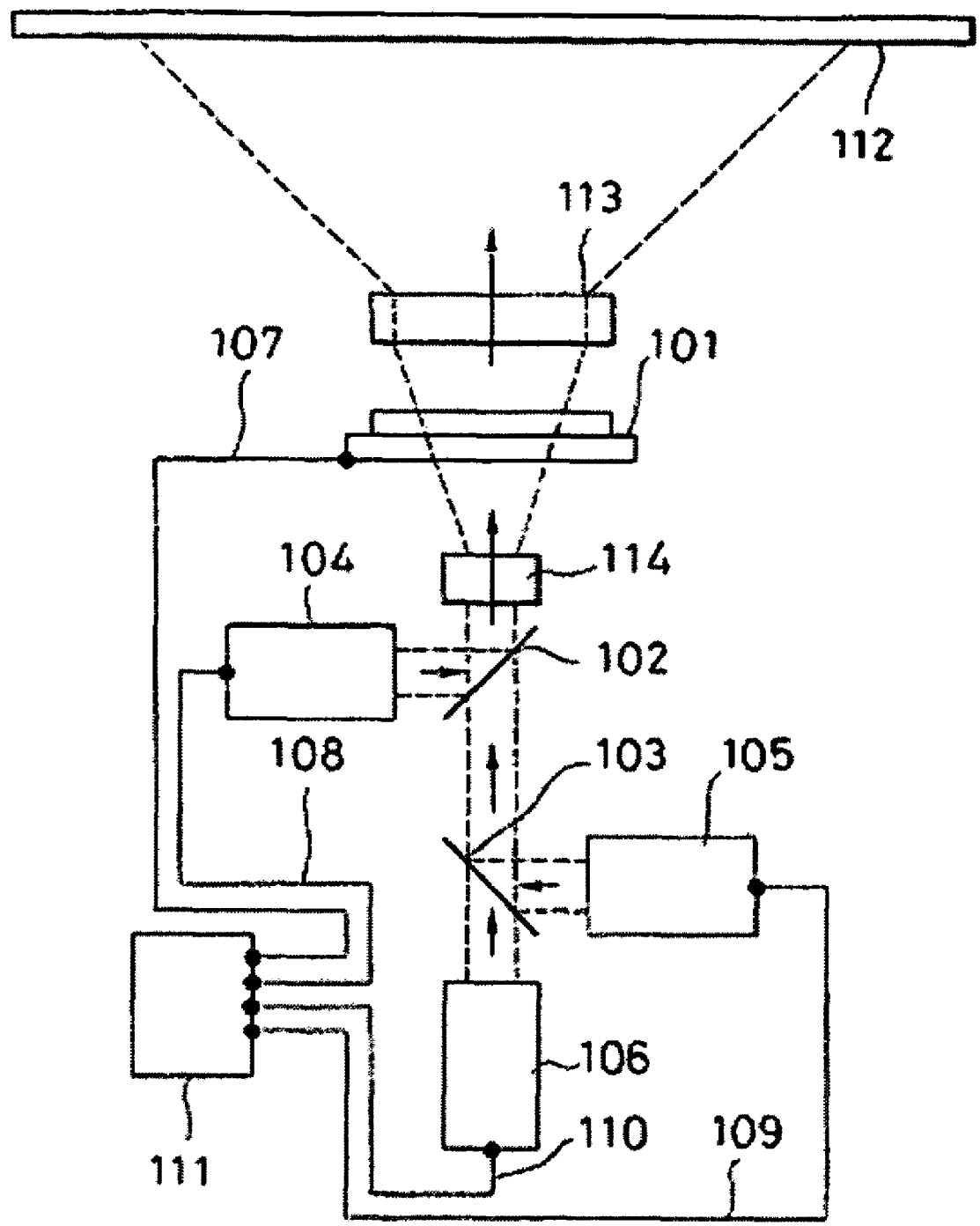
FIG. 2 shows a conventional projection display system configured to converge the optical axes of laser lights from plural laser light sources to the same optical axis by using mirrors.
Figure 13C:
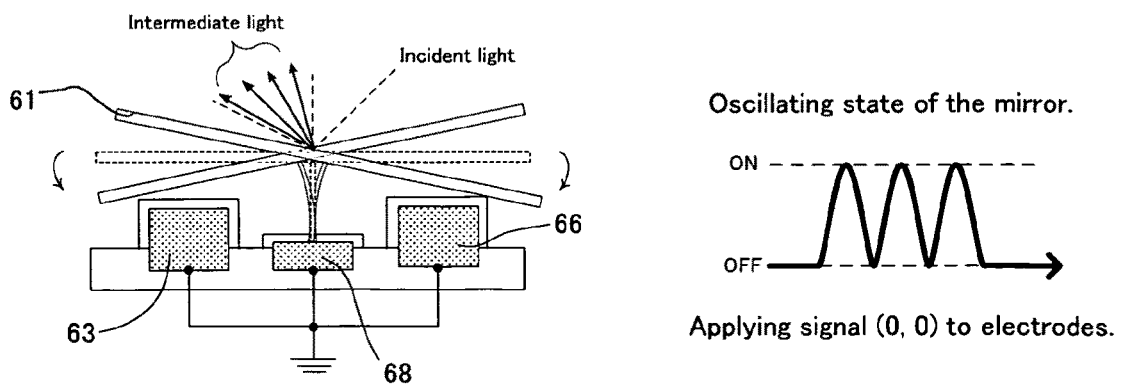
FIG. 13C illustrates an example of a micromirror at an oscillating state which reflects incoming light partially.

As illustrated in FIG. 13C, when a mirror is operated in an oscillating condition, an output light with light intensity below that of ON position is generated. The oscillating state is achievable by providing two electrodes under the mirror with zero volts or (0, 0) when the mirror is in the position of ON or OFF state. The driving circuit in FIG. 1C of prior art do not have a flexibility to operate the mirror in the oscillating state due to the requirement of using a multi-bit input to control the mirror. Various computerized simulations revealed that the average reflectance is from 20% to 40% depending on optical configurations. If we choose an optical system suitably, we can adjust the reflectance to 25% or ¼. This enables us to obtain ¼ of output brightness without changing the intensity of incoming light.

By applying multiple pulses to the electrodes under the mirror as illustrated in FIG. 13C illustrate as arrows in left side, in the middle of an ON position, a ¾ reflectance is achieved.

Figure 14:
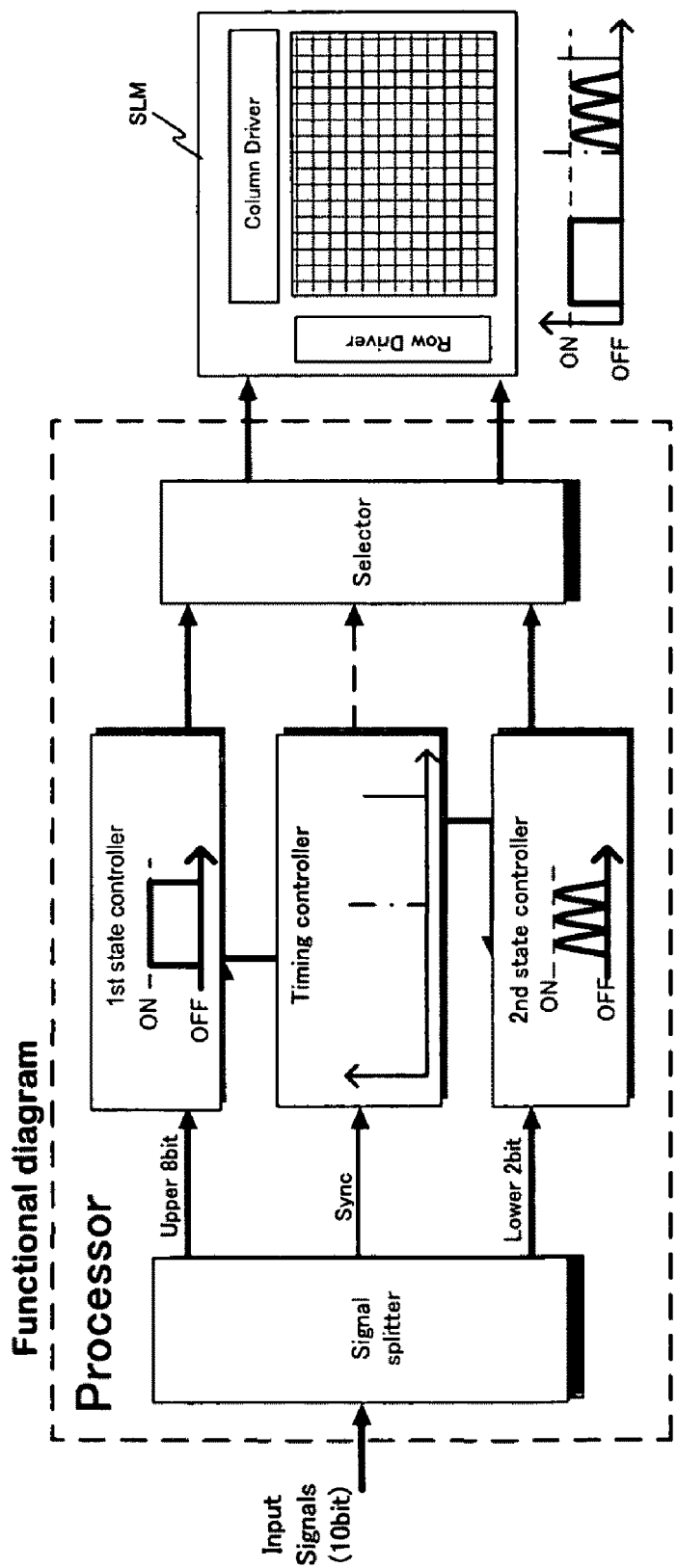
FIG. 14 illustrates an example of a system diagram in accordance with the present invention.

FIG. 14 is a functional block diagram of an exemplary embodiment for controlling the display system. The image display system received a 10 bit-incoming signal. The input signal is split into two parts including the upper 8 bits and lower 2 bits. The upper 8 bits are sent to the $1^{st}$ state controller, the lower 2 bits are sent to the $2^{nd}$ state controller and the sync signal is sent to the timing controller. The $2^{nd}$ state controller converts the binary data to non-binary data. Such a configuration makes it possible to control the $1^{st}$ state and $2^{nd}$ state by mixing them in one frame. Further, in the case of applying this configuration to a system employing a single-plate color sequence, the $2^{nd}$ state is displayed sequentially at 180 Hz or higher. This configuration makes it possible to allocate the control time of the $2^{nd}$ State within the sub-frames respectively corresponding to the three colors, i.e., red, green and blue. It is also possible to configure a six-color display by adding cyan, magenta and yellow.

A sync signal is generated at the signal splitter. The timing controller controls a selector in accordance with the sync signal, causing the selector change over which causes either the $1^{st}$ state controller to control the deflection mirror device or the $2^{nd}$ state controller to control it.

The color green has the highest visual sensitivity for humans. Therefore, it is also possible to display only green in a 14-bit gradation and the other colors in a 12-bit level of display.

In an exemplary embodiment, a white illumination light containing the colors of red, green and blue for illumination is applied. The illumination light is applied separately from the respective colors of red, green and blue. The white light is used only in the $1^{st}$ state in this case.

The projection display system, according to the present invention, projecting an image wherein the display system includes an optical element for expanding the individual laser light beams of the laser lights projected from laser light sources having different beam axes and a deflection mirror device for modulating the respective laser light beams in a time division by receiving the beams expanded by the optical element.

The present invention has been described by exemplifying references as specific embodiments, however, it shall be made clear that modifications and changes can be applied to these embodiments within the scope and concept of the present invention. Therefore, the present specification document and drawings shall be regarded as specific examples in lieu of being restrictive in meaning.

The aspect of the additional statement 1 of a projection display system according to the present invention is to provide the system comprising: an optical element for transmitting light beams from plural laser light sources having mutually different beam axes in the different beam axes as is; a deflection mirror device, receiving the light beams, for modulating them in a time division; and a projection optical system for projecting a reflected light from the deflection mirror device illuminated with the light beams.

Next, the aspect of the additional statement 2 of the projection display system according to the present invention is to provide the system comprising: an optical element for illuminating light beams from plural laser light sources having mutually different beam axes in an irradiation range comprising the cross-section of light beams of respectively different zones or different area sizes; a deflection mirror device, receiving the light beams, for modulating them in a time division; and a projection optical system for projecting a reflected light from the deflection mirror device illuminated with the light beams.

Further, the aspect of the additional statement 3 of the projection display system according to the present invention is to provide the system comprising: an optical element for expanding light beams from plural laser light sources so as to be non-uniform or asymmetrical in the cross-section of light beam at the pupil position of a projection lens; a deflection mirror device, receiving the light beams expanded by the optical element, for modulating them in a time division; and a projection optical system for projecting a reflection light from the deflection mirror device illuminated with the light beams.

In the aspects of the additional statements 1, 2 and 3 of the projection display system according to the present invention, the plural laser light sources are desirably a semiconductor laser including any two of wavelength zones of approximately 540 nm±20 nm, 630 nm±20 nm and 460 nm±20 nm.

Further, in the aspects of the additional statements 1, 2 and 3 of the projection display system according to the present invention, a preferable configuration is such that the light beams emitted from the plural laser light sources are those of red, green and blue, and that the optical intensities of the light beams irradiating the deflection mirror device are 10:1 or higher in terms of the ratio of green to blue, 2:1 or higher in terms of the ration of green to red, or 3:1 or higher in terms of the ratio of red to blue.

Further, in the aspects of the additional statements 1, 2 and 3 of the projection display system according to the present invention, the individual laser light source may be configured to place the plural laser elements in a two-dimensional array.

Moreover, in the aspects of the additional statements 1, 2 and 3 of the projection display system according to the present invention, the beam axes of the plural laser light sources may be configured to have different angles in a direction perpendicular to the mirror array surface of the deflection mirror device.

Further, in the aspects of the additional statements 1, 2 and 3 of the projection display system according to the present invention, the beam axes of the plural laser light sources may be configured to have different angles in a direction parallel to the mirror array surface of the deflection mirror device.

Furthermore, in the aspects of the additional statements 1, 2 and 3 of the projection display system according to the present invention, the light beams irradiated onto the individual deflection mirror elements from the plural laser light sources by way of an optical element may have an elliptical form or an elongated cross-sectional form in a direction perpendicular to the deflection axis of the deflection mirror element.

Further, in the aspects of the additional statements 1, 2 and 3 of the projection display system according to the present invention, the light beams irradiated onto the individual deflection mirror elements from the plural laser light sources by way of an optical element may be an elliptical form or elongated cross-sectional form in a direction parallel to the deflection axis of the deflection mirror element.

Further, in the aspects of the additional statements 1, 2 and 3 of the projection display system according to the present invention, the reflection light beams, reflected by the deflection mirror device, from the plural laser light sources expanded by way of an optical element may be expanded only in a prescribed direction relative to the pupil diameter of the projection optical system.

Moreover, the aspects of the additional statements 1, 2 and 3 of the projection display system according to the present invention may be configured such that the plural deflection mirror elements constituting the deflection mirror device are controlled under an ON state reflecting the light beam illuminating the deflection mirror element toward the projection optical system, an OFF state reflecting the light beam away from the projection optical system, an intermediate state reflecting the light beam partially toward the projection optical system, or an oscillating state repeating between the ON state and OFF state, and that the optical intensity, being transmitted through the projection optical system and that is from the reflection light beam which is a result of reflecting the beams from the plural laser light sources is different for each laser light source in the intermediate state or oscillating state.

Furthermore, the aspects of the additional statements 1, 2 and 3 of the projection display system according to the present invention are preferably to be configured such that the plural deflection mirror elements constituting the deflection mirror device are controlled under an ON state reflecting the light beam illuminating the deflection mirror element toward the projection optical system, an OFF state reflecting the light beam so as to be away from the projection optical system, an intermediate state reflecting the light beam partially toward the projection optical system, or an oscillating state repeating between the ON state and OFF state, and the entire reflection light beam which is a result of reflecting the light beams from the plural laser light sources is not transmitted through the projection optical system or become minimal in the OFF state.

Further, the aspects of the additional statements 1, 2 and 3 of the projection display system according to the present invention may be configured such that the light beams from two laser light sources are illuminated on the deflection mirror device in a time sequence by way of an optical element so that either one of the two light beams is modulated during the time of ½ of one frame or more.

Further, the aspects of the additional statements 1, 2 and 3 of the projection display system according to the present invention may be configured such that the light beams from three laser light sources are illuminated on the deflection mirror device in a time sequence by way of an optical element so that any one of the light beams is modulated during the time period of ⅓ of one frame or less.

Moreover, the aspects of the additional statements 1, 2 and 3 of the projection display system according to the present invention may be configured such that the plural laser light sources have a period of emitting light beams simultaneously.

Furthermore, the aspects of the additional statements 1, 2 and 3 of the projection display system according to the present invention may be configured such that the plural laser light sources are constituted by laser light sources of the same color.

The aspects of the additional statements 1, 2 and 3 of the projection display system according to the present invention may preferably be configured such that the illumination light intensity of the light beams from the plural laser light sources is changed in a time sequence.

The configuration of the projection display system according to the present invention as described above eliminates the need to match the plural laser light sources to the same beam axis by using a plurality of mirrors corresponding to the respective laser lights, simplifies the configuration per se and also increases the freedom of design of a projection display system.

Next, the aspect of the additional statement 1 of a deflection mirror device used for a projection display system according to the present invention is to provide the deflection mirror device comprising plural deflection mirror elements for modulating light beams, in a time division, from plural laser light sources having mutually different beam axes, wherein the deflection mirror element reflects between 80% and 100% of the light beam from at least one light source when the deflection mirror element is in an ON state reflecting the beam illuminating the deflection mirror element toward the pupil of a projection optical system.

Further, the aspect of the additional statement 2 of a deflection mirror device used for a projection display system according to the present invention is to provide the deflection mirror device, comprising plural deflection mirror elements for modulating light beams, in a time division, from plural laser light sources having mutually different beam axes and different colors, wherein the optical intensity of the light beam reflected toward the pupil of the projection optical system is determined to be one corresponding to the magnitude of visibility of color when the deflection mirror element is in an ON state reflecting the beam illuminating the deflection mirror element toward the pupil of a projection optical system.

Further, the aspect of the additional statement 3 of a deflection mirror device used for a projection display system according to the present invention is to provide the deflection mirror device comprising plural deflection mirror elements for modulating light beams, in a time division, from plural laser light sources having mutually different beam axes, wherein the optical intensity of reflecting the light beam reflected by the deflection mirror element toward the pupil of the projection optical system is different depending on the beam axis of the light beam when the deflection mirror element is in an ON state reflecting the beam illuminating the deflection mirror element toward the pupil of a projection optical system.

Further, the aspect of the additional statement 4 of a deflection mirror device used for a projection display system according to the present invention is to provide the deflection mirror device comprising plural deflection mirror elements for modulating light beams, in a time division, from plural laser light sources having mutually different beam axes, wherein the deflection mirror device comprises: an ON state reflecting the light beam illuminating the deflection mirror element toward the projection optical system, an OFF state reflecting the light beam so as to be away from the projection optical system, an intermediate state reflecting the light beam partially toward the projection optical system, or an oscillating state repeatedly alternating between the ON state and OFF state.

Moreover, the aspect of the additional statement 5 of a deflection mirror device used for a projection display system according to the present invention is to provide the deflection mirror device comprises: an ON state reflecting the light beam illuminating the deflection mirror element toward the projection optical system, an OFF state reflecting the light beam so as to be away from the projection optical system, an intermediate state reflecting the light beam partially toward the projection optical system, or an oscillating state repeatedly alternating between the ON state and OFF state, wherein a modulation control for repeating the light beam is controlled with the non-binary data of a video signal.

The deflection mirror device of the aspect of the additional statements 1 through 5 used for the projection display system according to the present invention may also be configured such that the deflection mirror element is an approximate square with one side being between 4 micrometers and 14 micrometers and such that the reflectance ratio of light beam is different for each color of the laser light sources.

Further, the deflection mirror device of the aspect of the additional statements 1 through 5 used for the projection display system according to the present invention may also be configured such that the deflection mirror element is an approximate square with one side being between 4 micrometers and 14 micrometers and such that the light beam reflected by the deflection mirror element and being transmitted through the pupil of the projection lens contains the diffraction light from the mirror of the deflection mirror element.

Furthermore, the deflection mirror device of the aspect of the additional statements 1 through 5 used for the projection display system according to the present invention may also be configured such that one wire for transmitting data to the deflection mirror element is provided for one deflection mirror element and such that three values of voltage are provided for controlling the deflection mirror element.

Further, the deflection mirror device of the aspect of the additional statements 1 through 5 used for the projection display system according to the present invention may also be configured such that one electrode for controlling the deflection mirror element is provided for one deflection mirror element, with the electrode placed straddling the ON side and OFF side of the mirror.

Moreover, the deflection mirror device of the aspect of the additional statements 1 through 5 used for the projection display system according to the present invention may also be configured such that the timing for controlling the deflection mirror element is synchronized with the timing for driving the laser light source.

Further, the deflection mirror device of the aspect of the additional statements 1 through 5 used for the projection display system according to the present invention may also be configured to irradiate the light beams which are emitted from the plural laser light sources which are mutually different in beam axis, in the form of the cross-section of light beam or in the area size of the range of irradiation and which have been transmitted through an optical element, onto the deflection mirror element modulating, in a time division.

Lastly, an image projection method is provided in which the light beams emitted from plural laser light sources are expanded by an optical element so that the beam axes, the form of an irradiation range, or the size of the irradiation range is different, the individual light beams expanded by the optical element are modulated in a time division by the deflection mirror device, and the light beams modulated in a time division are reflected toward a projection optical system when the deflection mirror element is constituted of the deflection mirror device being in the state of reflecting the light beam illuminating the deflection mirror element, thereby projecting an image as an image projection method according to the present invention.

The plural laser light sources used for the image projection method according to the present invention may also be constituted by at least two color light sources, with the plural laser light sources being controlled in a time division so that the gradation of each color of the image which is a result of projecting the plural laser light sources.

A single laser light source of the plural laser light sources used for the image projection method according to the present invention may desirably be configured to place the plural laser elements in a two-dimensional array, with the difference in wavelength of each laser element being no more than 3 nm.

Furthermore, the image projection method according to the present invention may be carried out by using at least three laser light sources and at least two deflection mirror devices.

The image projection method according to the present invention is preferably to set the beam axes of the respective laser light sources so that at least one of the light beams from the plural laser light sources is reflected along the optical axis of the projection light path when the deflection mirror element is in the ON state.

Moreover, the wavelength of a laser light source of a part of the plural laser light sources used for the image projection method according to the present invention may allow a difference of between 5 nm and 10 nm.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A projection display system, comprising:
a plurality of laser light sources each emitting an illumination light of a different color and projecting along a different beam axis;
an illumination optical system for receiving the illumination light from said laser light sources for projecting each of said illumination lights along a different projection angles to a deflection mirror device wherein the deflection mirror device modulating the illumination lights of said different colors to reflect each of said illumination lights to a projection lens wherein each of said illumination lights is reflected and projected to said projection lens with different shifts in a X-Y plane as a plane substantially perpendicular to an optical path of said illumination lights;
a laser light source control circuit for controlling the projection of the illumination light of each color from said laser light sources, wherein
the laser light source control circuit adjusts said different shifts in said X-Y plane of each color for adjusting a transmission ratio of each of said illumination lights projected through the projection lens for adjusting a ratio of intensity of each of the colors projected through said projection lens according to a prescribed ratio.

2. The projection display system according to claim 1, wherein:
the plurality of laser light sources emit the illumination lights of red, green and blue colors, wherein
the laser light source control circuit further controls the intensity of the illumination light of each of the colors irradiating the deflection mirror device with a green to blue ratio of 10:1 or higher, with a green to red ratio of 2:1 or higher, or with a red to blue ratio of ratio of 3:1 or higher.

3. The projection display system according to claim 1, wherein:
the plurality of laser light sources emit the illumination lights of red, green and blue colors, and
the projection display device further comprises a color switching filter for mixing said illumination lights of said red, green and blue colors for irradiating the deflection mirror device with lights of different mixed colors including lights of cyan, magenta, yellow and white.

4. The projection display system according to claim 1, wherein:
the deflection mirror device further comprising a plurality of mirror elements controlled to operate in an ON state and an OFF state, and
the ratio of the intensity for each of the colors projected through said projection lens for image display is a function of the length of time when each of the mirror element is controlled to operate in the ON state.

5. The projection display system according to claim 1, wherein:
the deflection mirror device further comprising a plurality of mirror elements controlled to operate in an ON state, an OFF state, and an oscillating state, and the ratio of the intensity for each of the colors projected though said projection lens is dependent on a position of a pupil of the projection lens relative to reflection lights from the mirror elements in the oscillating state.

6. The projection display system according to claim 1, wherein:
the laser light source control circuit further controls an irradiation light intensity per unit area on the irradiation surface of the deflection mirror device for controlling the ratio of the intensity for each of the colors projected though said projection lens.

7. The projection display system according to claim 1, wherein:
the laser light source control circuit further controls the ratio of the intensity of the illumination light of each of the colors is to achieve an intensity of lights projected through the pupil of the projection optical system.

8. The projection display system according to claim 1, wherein:
the laser light source control circuit controls the light intensity of each of the illumination lights for each of the colors by applying a pulse emitting control process to irradiating a plurality of laser light pulses of different colors.

9. The projection display system according to claim 1, wherein:
the laser light source control circuit controls said laser light sources of different colors to irradiating laser lights according to a periodic time division manner within each display frame period.

10. The projection display system according to claim 9, wherein:
the laser light source control circuit further controls the illumination light of each of the colors for irradiating the deflection mirror device for modulation in at least a time period of ¼ to ½ of the display period of the one frame; and said colors including at least one secondary color selected from a group of secondary colors consisted of cyan, yellow, magenta and white.

11. The projection display system according to claim 1, wherein:
said plurality of laser light sources further comprising an array of light emitting diode (LED) sub-laser light sources.

12. The projection display system according to claim 1, wherein:
said plurality of laser light sources further comprising an array of sub-laser light sources, wherein
the laser light source control circuit controls the number or locations of sub-laser light sources in said array for emitting said illumination lights of different colors.

13. The projection display system according to claim 1, wherein:
The plurality of laser light sources comprising an array of sub-laser elements, wherein the wavelengths of the individual sub-laser elements are different by 1 nm to 3 nm.

14. The projection display system according to claim 1, wherein:
the deflection mirror device modulates the illumination lights emitted from said laser light sources for projecting lights of different colors to display an image with an equal number of gray scales for each of the colors.

15. The projection display system according to claim 1, wherein:
the deflection mirror device modulates the illumination lights emitted from said laser light sources for projecting lights of different colors to display an image with different number of gray scale gradations for each of the colors.

16. The projection display system according to claim 1, wherein:
the plurality of laser light sources comprising laser light sources of at least three colors, and
the projection display system further comprises at least two deflection mirror devices, wherein
each of the deflection mirror devices modulates the illumination light from the laser light sources of at least two colors.

17. The projection display system according to claim 1, wherein:
the deflection mirror device further comprises a plurality of mirror elements, wherein each of the mirror elements having a square shape with a length of each side ranging between 4 micrometers to 10 micrometers and has a different reflectance efficiency for each of the colors of the laser light sources.

18. A projection display system, comprising:
a plurality of laser light sources for emitting a plurality of illumination lights;
an illumination optical system for receiving the illumination light from said laser light sources for projecting each of said illumination lights along a different projection angles to a deflection mirror device wherein the deflection mirror device modulating the illumination lights of said different colors to reflect each of said illumination lights to a projection lens wherein each of said illumination lights is reflected and projected to said projection lens with different shifts in a X-Y plane as a plane substantially perpendicular to an optical path of said illumination lights;
a control circuit for controlling modulation of each of the colors in sequence within one frame by adjusting a modulation time of the deflection mirror device and adjusts said different shifts in said X-Y plane of each color for adjusting a ratio of intensity of each of the colors according to a prescribed value.

19. The projection display system according to claim 18, wherein:
the deflection mirror device is controlled by applying a non-binary video signal.

20. The projection display system according to claim 18, wherein:
the deflection mirror device comprises a plurality of mirror elements wherein each of said mirror elements is controlled to operate in an ON state, an OFF state and an oscillating state.

21. The projection display system according to claim 18, wherein:

the deflection mirror device modulates the illumination lights emitted from said laser light sources for projecting lights of different colors to display an image with different number of gray scales of an image projected by modulating the illumination light from the laser light sources of each of the colors.

22. The projection display system according to claim 18, wherein:

the control circuit controlling the deflection mirror device for modulating each of the colors in sequence within one frame by adjusting a time of the deflection mirror device to control a number of the gray scales of each of the colors in accordance with a length of said modulation time for each of said colors.

23. The projection display system according to claim 18, wherein:

the control circuit further applies a video signal to control the deflection mirror device for modulating each of lights of said colors for adjusting a number of the gray scales in accordance with the video signal.

24. The projection display system according to claim 18, wherein:

the plurality of laser light sources further comprising laser light sources of at least three colors, and the projection display system further comprising at least two deflection mirror devices, wherein each of the deflection mirror devices modulates the illumination light from the laser light sources of at least two colors.

25. The projection display system according to claim 1, wherein:

said plurality of laser light sources further emitting said illumination lights with each of said illumination lights having a different color transmitted with a different predetermined polarization direction.

26. A projection display system, comprising:

a plurality of laser light sources each emitting an illumination light of a substantially same color and transmitted with different polarization directions; and an illumination optical system for receiving the illumination light from said laser light sources for projecting each of said illumination lights transmitted with said different polarization directions to a mirror device wherein the mirror device modulating the illumination lights of said different polarization directions to reflect each of said illumination lights to a projection lens wherein each of said illumination lights is reflected and projected through the projection lens to a screen at a different time period.

27. The projection display system according to claim 26 further comprising:

at least a second mirror device and said illumination optical system further projecting each of said illumination lights transmitted with said different polarization directions to different mirror devices wherein each of said mirror devices modulating one of said illumination lights transmitted with one of said polarization directions.

* * * * *